(12) United States Patent
Alessandrini

(10) Patent No.: US 10,030,915 B2
(45) Date of Patent: Jul. 24, 2018

(54) HEAT EXCHANGER

(75) Inventor: Alberto Alessandrini, Meldola (IT)

(73) Assignee: COSMOGAS S.R.L., Meldola (FC) (IT)

( * ) Notice: Subject to any disclaimer, the term of this patent is extended or adjusted under 35 U.S.C. 154(b) by 1074 days.

(21) Appl. No.: 14/118,774

(22) PCT Filed: May 18, 2012

(86) PCT No.: PCT/IB2012/052515
§ 371 (c)(1),
(2), (4) Date: Nov. 19, 2013

(87) PCT Pub. No.: WO2012/156954
PCT Pub. Date: Nov. 22, 2012

(65) Prior Publication Data
US 2014/0138053 A1    May 22, 2014

(30) Foreign Application Priority Data

May 19, 2011 (IT) .............. TO2011A0446

(51) Int. Cl.
| F28D 7/10 | (2006.01) |
| F28F 1/00 | (2006.01) |
| F24H 1/43 | (2006.01) |
| B23P 15/26 | (2006.01) |
| F24H 1/16 | (2006.01) |

(52) U.S. Cl.
CPC ............ *F28F 1/00* (2013.01); *B23P 15/26* (2013.01); *F24H 1/165* (2013.01); *F24H 1/43* (2013.01); *Y10T 29/49362* (2015.01)

(58) Field of Classification Search
CPC ............ F28F 1/00; F28D 7/022; F28D 7/024
USPC .................................. 165/163, 158
See application file for complete search history.

(56) References Cited

U.S. PATENT DOCUMENTS 1,825,433 A * 9/1931 White ............... F24H 1/165
                                                              122/250 R
4,357,910 A * 11/1982 Blockley et al. ......... F22B 3/02
                                                              122/248

(Continued)

FOREIGN PATENT DOCUMENTS

CN     103026143 A     4/2013
DE     2129585 A1  *  12/1971  ............. F28D 7/022

(Continued)

OTHER PUBLICATIONS

Chinese Office Action dated Aug. 5, 2015, for corresponding Chinese Application No. 201280024200.X.

(Continued)

*Primary Examiner* — Allen Flanigan
(74) *Attorney, Agent, or Firm* — Heslin Rothenberg Farley & Mesiti P.C.; Victor A. Cardona, Esq.

(57) ABSTRACT

A heat exchanger has a heat-exchanger unit includes one or more substantially coaxial coiled tubes and a casing for housing the heat-exchanger unit. The casing has a first end wall, a second end wall, and a peripheral part between the two end walls. Each tube has a first end and a second end. The heat-exchanger unit is supported by the first end wall of the casing, with the first end and the second end of each tube that is located substantially at the first end wall of the casing.

16 Claims, 17 Drawing Sheets

(56) References Cited

U.S. PATENT DOCUMENTS

| | | | | | |
|---|---|---|---|---|---|
| 4,893,672 | A | * | 1/1990 | Bader | F28D 7/024 |
| | | | | | 165/163 |
| 5,004,046 | A | * | 4/1991 | Jones | F28D 7/106 |
| | | | | | 165/156 |
| 5,379,832 | A | * | 1/1995 | Dempsey | B21C 37/15 |
| | | | | | 165/110 |
| 6,068,047 | A | * | 5/2000 | Buchhave | C02F 11/185 |
| | | | | | 165/156 |
| 2005/0145370 | A1 | * | 7/2005 | Merryfull | F24D 3/087 |
| | | | | | 165/104.19 |
| 2006/0196450 | A1 | * | 9/2006 | Le Mer | F24H 1/43 |
| | | | | | 122/18.1 |
| 2007/0000653 | A1 | * | 1/2007 | Alessandrini et al. | F24H 1/43 |
| | | | | | 165/163 |

FOREIGN PATENT DOCUMENTS

| | | |
|---|---|---|
| DE | 20 2006 016339 U1 | 1/2007 |
| EP | 1 813 882 A1 | 8/2007 |
| EP | 1 965 146 A1 | 9/2008 |
| GB | 1294730 A | 10/1970 |
| WO | 2004/036121 A1 | 4/2004 |
| WO | 2005/080900 A2 | 9/2005 |
| WO | 2011/117803 A2 | 9/2011 |

OTHER PUBLICATIONS

International Search Report for International Application No. PCT/IB2012/052515, dated Sep. 17, 2012.

* cited by examiner

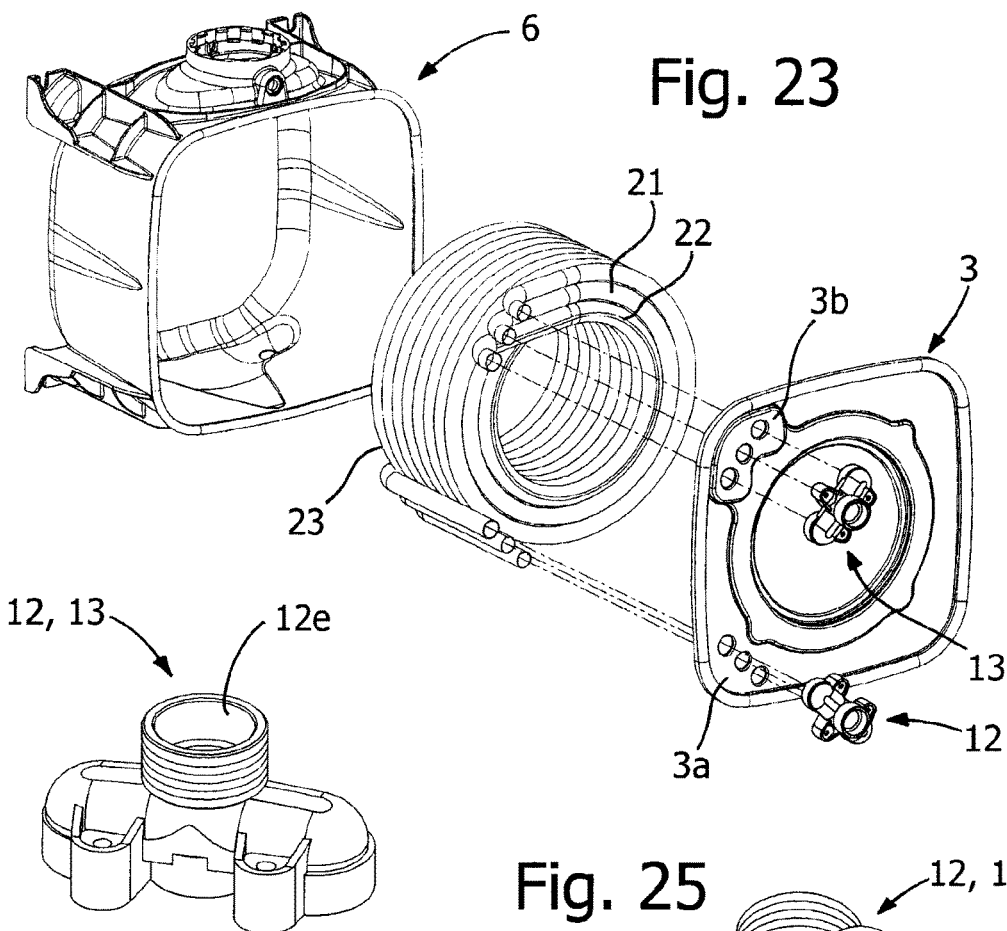
Fig. 23
Fig. 24
Fig. 25
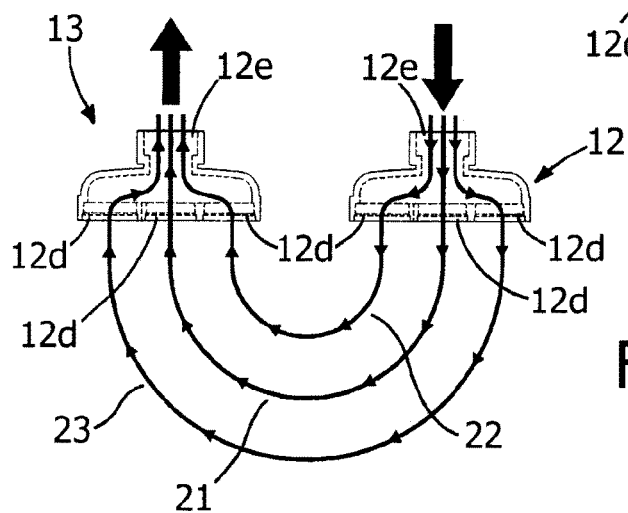
Fig. 26

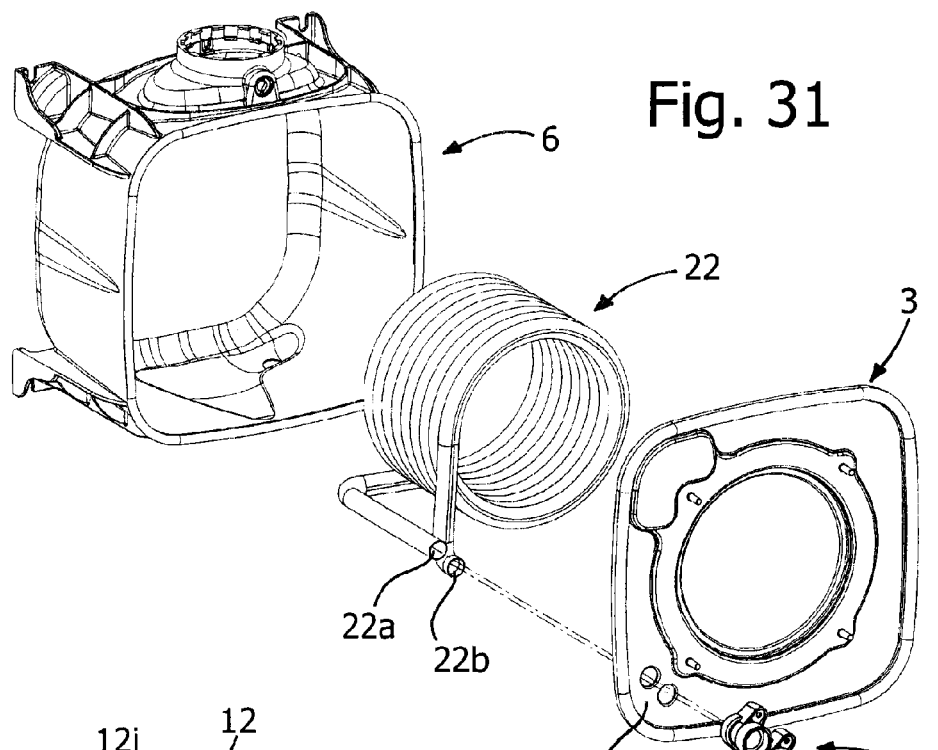
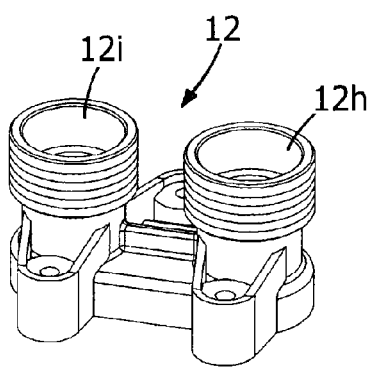
Fig. 32
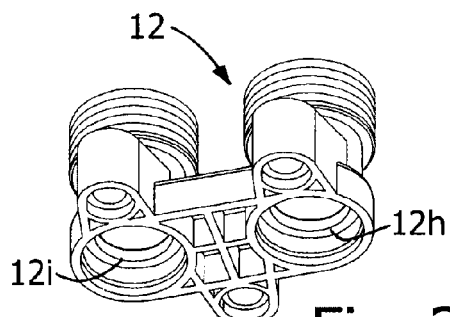
Fig. 33
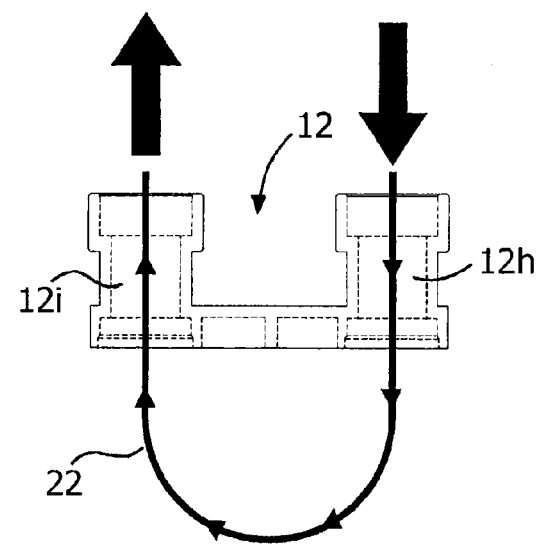
Fig. 34

HEAT EXCHANGER

CROSS REFERENCE TO RELATED APPLICATIONS

This application is a 371 National Phase of PCT International Application No. PCT/IB2012/052515 filed on May 18, 2012, and published in English as WO 2012/156954 A1 on Nov. 22, 2012, which claims priority to Italian Patent Application No. TO2011A000446 filed on May 19, 2011, the entire disclosures of which are incorporated herein by reference.

FIELD OF THE INVENTION

The present invention relates to a heat exchanger, in particular of the condensation type.

PRIOR ART

The function of a heat exchanger is to transfer thermal energy between two fluids; for example, in the case of domestic gas boilers, the function of the heat exchanger is to heat water that circulates inside it, starting from the hot fumes that result from the combustion produced via a burner. Said boilers are devised for exploiting both the heat that develops following upon combustion and the latent condensation heat, contained in the combustion fumes. In order to recover the heat contained in the fumes the heat exchanger comprises a casing, defined within which is a path for circulation of the water, against which the fumes are made to flow.

The amount of condensation heat that is recovered mainly depends upon the temperature of delivery and return of the water to/from the heat exchanger. Moreover, to obtain a considerable heat exchange between the fluids inside and outside the path of the heat exchanger, it is necessary to have a heat-exchange surface that is as extensive as possible. For this purpose, the aforesaid path can include a plurality of coiled pipes or tubes, set substantially coaxial to one another, the innermost tube of the plurality surrounding the burner. In the case of boilers of low power, on the other hand, the heat exchanger may even include just a single coiled pipe.

In a first type of solutions, a number of coiled tubes operate in parallel; i.e., they each extend between an inlet chamber and an outlet chamber of the heat exchanger, formed at the two axial ends of the corresponding casing. A solution of this type is known from WO 2005/080900.

In a second type of solutions, a number of coiled tubes are connected in series, via substantially U-shaped unions so that the water penetrates into the heat exchanger from the inlet of the first tube of the series and comes out of the heat exchanger through the outlet of the last tube of the series. A solution of this type is known from EP-A-1 813 882.

In known heat exchangers, the helix formed by the single coiled tube or the helices formed by the various coiled tubes are "packed" between two opposite end walls of the casing. This entails the need to provide significant masses of thermal insulators on the aforesaid end walls. This type of solution is moreover far from flexible from the production standpoint, given that the axial dimensions of the casing of the heat exchanger are determined by the axial dimensions of the coiled tubes. As has been said, the thermal power of a heat exchanger depends, among other things, upon the heat-exchange surface so that—but for further complications regarding production and cost—heat exchangers devised for different thermal powers differ from one another as regards the number of turns of the various tubes, and hence as regards the axial dimension of the corresponding helices. It will be understood that, given that said helices are packed between the two end walls of the casing, the latter must be purposely designed for each model of heat exchanger, at least as regards the size of its peripheral part, where also the fume outlet and the inlet and outlet unions for the water are usually defined.

These known solutions then present the further drawback that the testing step can practically be performed only when the heat exchanger has been practically completely assembled, i.e., with the set of coiled tubes mounted within the casing. In the case of defects of production (for example, leakage of liquid due to non-perfect welds or seals), the product must be at least in part dismantled, with the times and the costs that this involves.

In general terms, moreover, the structure of known heat exchangers is far from flexible also from the standpoint of the possibility of their installation in user apparatuses, such as boilers or water heaters, for example on account of the positioning of the unions for inlet and outlet of the water.

For instance, DE 202006016339 U1 discloses a heat exchanger in the casing of which a coiled finned tube defines one or more helices, the helix or helices being packed between two opposite end walls of the casing, with interposition of a thick mass of insulating material. In one solution, wherein the aforesaid tube is shaped so as to define two coaxial helices, inlet and outlet of the exchanger for a thermal-exchange fluid are at one and the same wall of the casing.

From WO2004/036121 A1 a heat exchanger is also known, in the casing of which there is housed at least one coiled tube having a generally flattened section. The aforesaid tube forms an helix which is packed between a front wall of the casing and a rear plate, between the front wall and the rear plate there extending cylindrical tie-rods, arranged outside of the helix and having a threaded front end for anchoring to the front wall of the casing. Such arrangement is provided for preventing possible expansions in an axial direction of the flattened section of the coiled tube.

SUMMARY OF THE INVENTION

In the light of the foregoing considerations, the object of the present invention is to solve one or more of the drawbacks referred to above, and in particular to provide an efficiently operating heat exchanger, of compact dimensions, simple and inexpensive to produce and test and distinguished by a high flexibility both in terms of production and in terms of installation. With a view to achieving said purpose, the subject of the invention is a heat exchanger, in particular of the condensation type, and a corresponding production process, having the characteristics specified in the attached claims, which form an integral part of the technical teaching provided herein in relation to the invention.

BRIEF DESCRIPTION OF THE DRAWINGS

Further objects, characteristics, and advantages of the invention will emerge from the ensuing description with reference to the annexed drawings, which are provided purely by way of non-limiting example and in which:

FIG. 6 is the detail of FIG. 5 designated by VI;

FIG. 23 is a view similar to that of FIG. 17, regarding a heat exchanger according to the invention, in a second configuration;

FIGS. 24 and 25 are two perspective views of a hydraulic connection member of the heat exchanger of FIG. 23;

FIG. 26 is a simplified hydraulic diagram of the heat exchanger of FIG. 23;

FIG. 31 is a view similar to that of FIG. 17, regarding a heat exchanger according to the invention, in a fourth configuration;

FIGS. 32 and 33 are two perspective views of a hydraulic connection member of the heat exchanger of FIG. 31;

FIG. 34 is a simplified hydraulic diagram of the heat exchanger of FIG. 31;

DESCRIPTION OF PREFERRED EMBODIMENTS OF THE INVENTION

Figure 1:
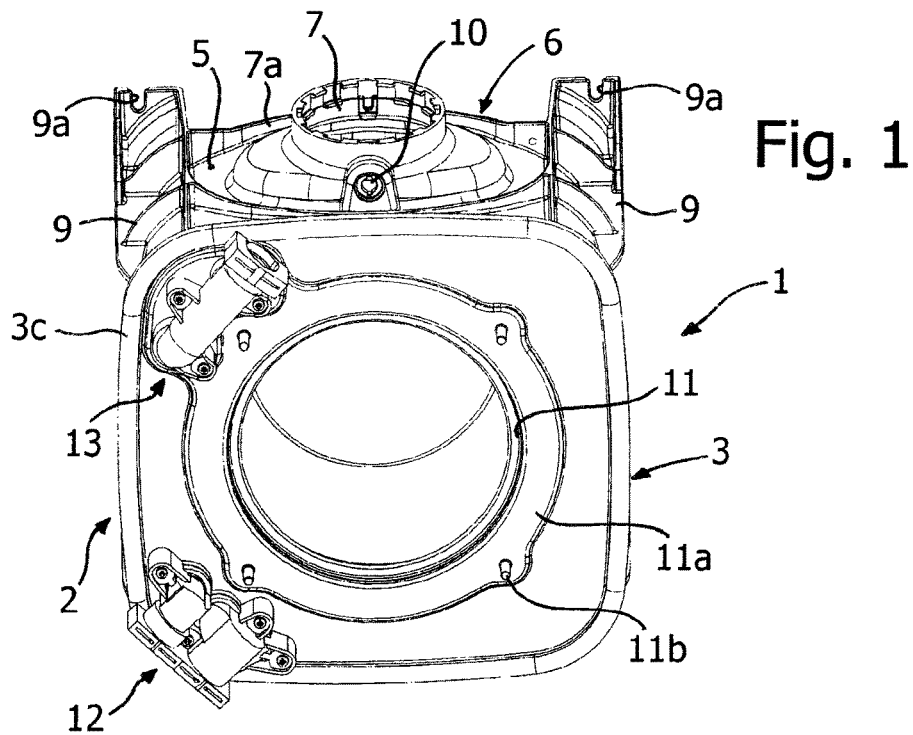
FIGS. 1 and 2 are perspective views of a heat exchanger according to the invention, in a first configuration.
Figure 2:
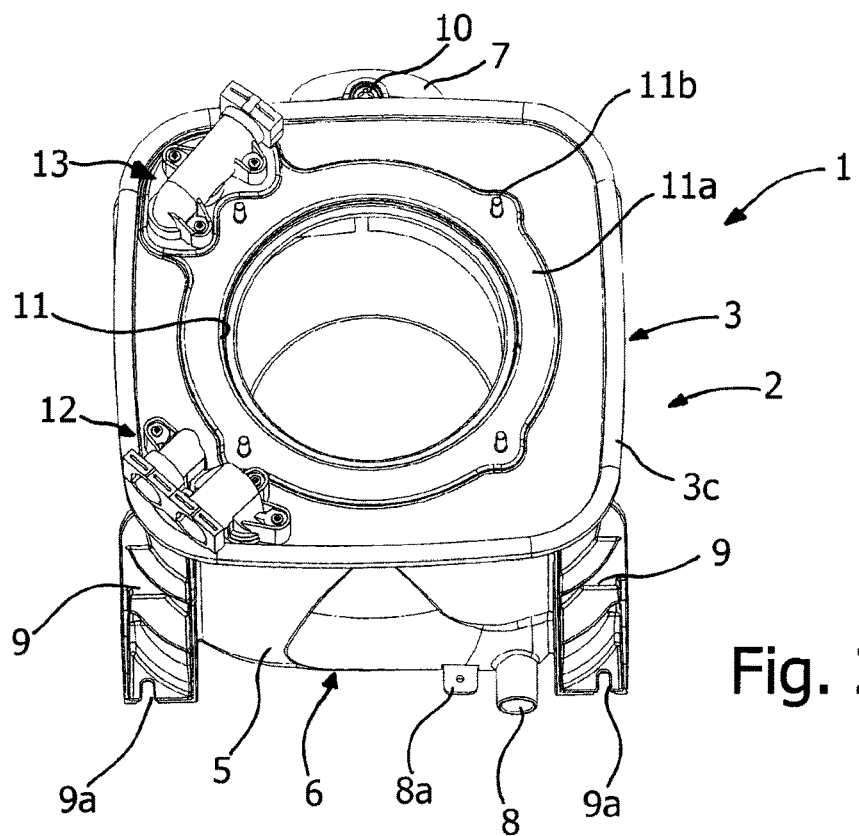
Figure 3:
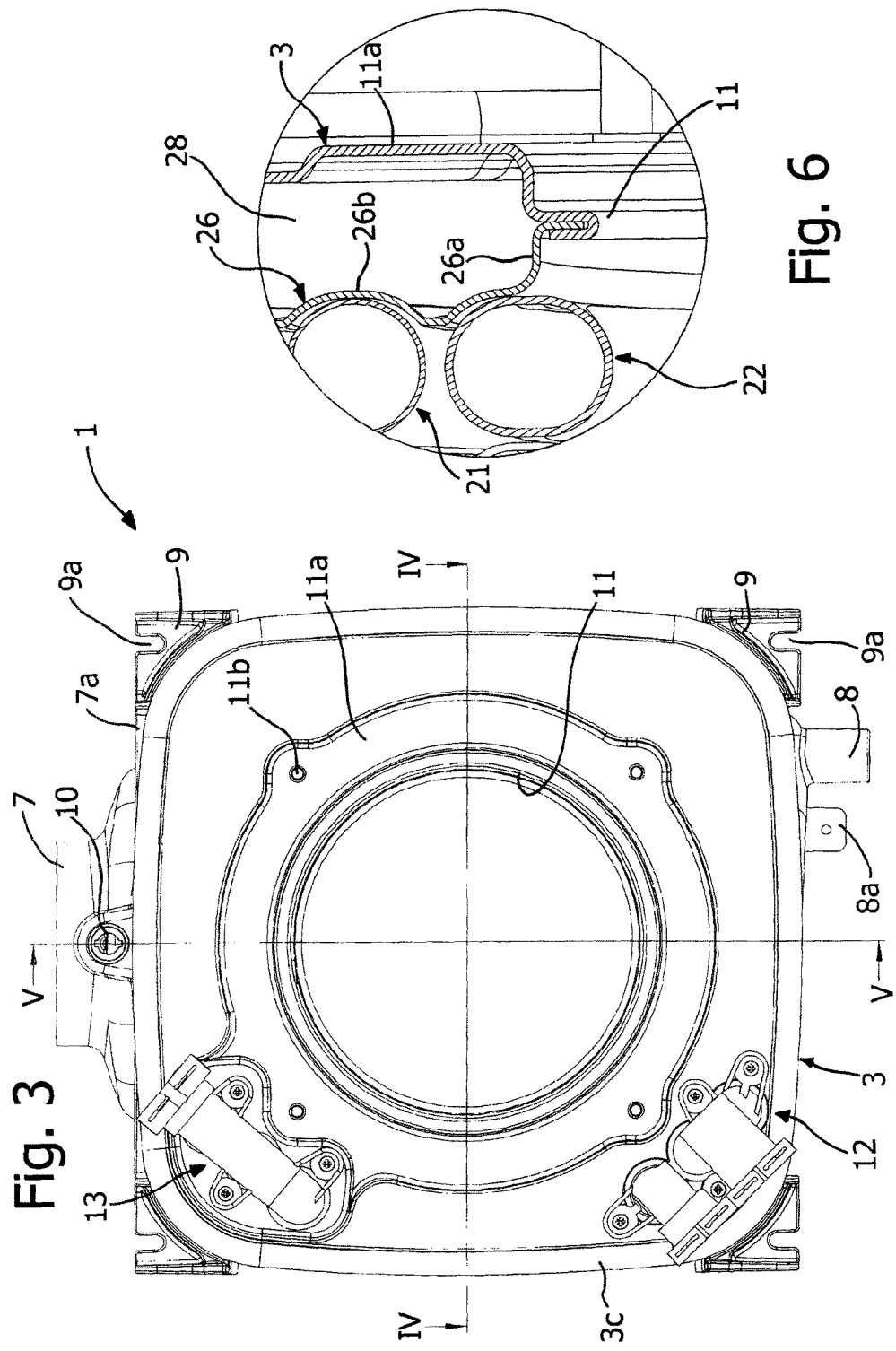
FIG. 3 is a front view of the heat exchanger of FIGS. 1 and 2.

Reference to "an embodiment" or "one embodiment" in the context of the present description is meant to indicate that a particular configuration, structure, or characteristic described in relation to the embodiment is comprised in at least one embodiment. Hence, phrases such as "in an embodiment" or "in one embodiment" and the like that may be present in different points of the present description do not necessarily all refer to one and the same embodiment. Moreover, the particular configurations, structures, or characteristics may be combined in any adequate way in one or more embodiments. The references used herein are merely for convenience and do not define the sphere of protection or the scope of the embodiments.

In the figures, designated as a whole by 1 is a heat exchanger, in particular of the condensation type for a gas boiler, provided according to the present invention.

The heat exchanger 1 comprises a casing 2 having two end walls 3 and 4, here defined as "front" and "rear" walls, and a peripheral part 5 that extends between the two walls 3 and 4. In the example represented, the walls 3 and 4 are substantially quadrangular, and the peripheral part 5 consists of four side walls orthogonal to one another; in a possible variant (not represented), the end walls are circular in shape, and the peripheral part is constituted by a single cylindrical wall.

In a preferred embodiment, the rear wall 4 and the peripheral part 5 are formed in a single body, designated by 6. Said single body 6 is preferably made of a mouldable synthetic or plastic material, such as, for example, polypropylene. Advantageously, the wall 3 can be coupled via crimping to the top edge of the peripheral part 5 of the body 6, as will emerge hereinafter.

Defined in the peripheral part 5, preferably but not necessarily in its opposite regions, are a fume outlet 7, a condensate outlet 8, and a connection for a fume-temperature sensor 10. Obviously, the position of the outlets 7 and/or 8 may be different from the one exemplified. Preferably, the single body 6 also includes ribbings or stiffening formations 9, for example at the edges of the part 5, as well as an anchoring flange 9a. In one advantageous embodiment, such as the one represented, the body 6 includes a collector for any possible water or condensate that might accidentally reach the heat exchanger via the corresponding intake duct for the air for supporting combustion (not represented herein). Such a duct is frequently set coaxial to the fume outlet 7, around it. In this perspective, the aforesaid collector substantially provides a collection tray defined around the outlet 7. In the example represented, said collector basically consists of a wall 7a made of a single piece in the body 6 that surrounds the outlet 7. Advantageously, the wall 7a can have a drainage opening, to which to connect a tube for evacuation of the water collected therein.

In an advantageous embodiment, such as the one represented, made of a single piece in the body 6 is also a radial wall or bracket 8a, for fixing of a siphon (not represented in so far as of a type in itself known) that is to be connected in fluid communication with the condensate outlet 8.

Figure 39:
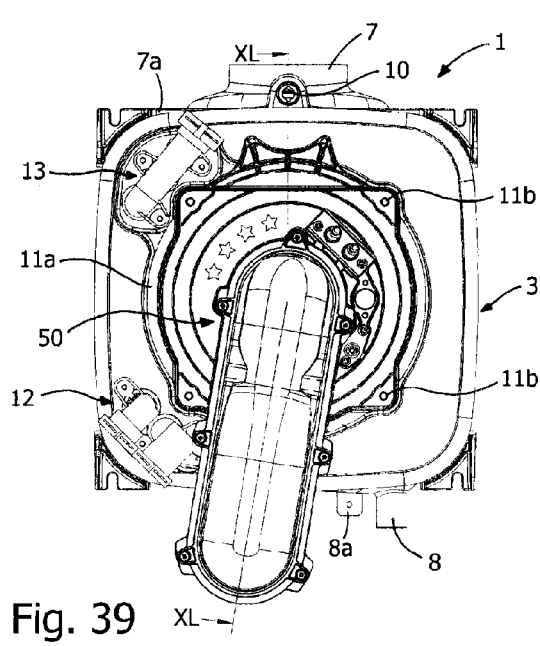
FIG. 39 is a view in front elevation of a heat exchanger according to FIGS. 1 and 2, moreover provided with a corresponding burner.

The wall 3 is made of a material resistant to high temperatures and to mechanical stresses, preferably a metal material, such as stainless steel, obtained by deformation of a sheet metal via operations of shearing and deformation. The wall 3 has a central passage 11, slightly deep-drawn inwards, in particular for mounting a burner (see, for example, FIGS. 39 and 40, where a burner is designated by 50). Preferably, there is envisaged a stiffening deep-drawn portion 11a that surrounds the opening 11 in order to prevent any deformation following upon installation of the burner. The deep-drawn portion 11a can support fixing pins 11b for the burner.

Fixed on the outside of the wall 3, in a position peripheral with respect to the passage 11, is a first hydraulic connection member 12 of the heat exchanger 1, for a fluid that here is assumed as being a liquid to be heated, in particular water. Preferably, the member 12 is fixed in the proximity of a corner of the wall 3.

As will emerge clearly from what follows, the member 12 has two internal pipes and functions both as an inlet connector and as an outlet connector for the liquid. In what follows, it will also emerge clearly how, advantageously, the inlet and the outlet for the liquid of the heat exchanger 1 are both positioned on one and the same end wall, i.e., the wall 3, preferably but not necessarily in positions set close to one another.

According to a preferential characteristic of the invention, fixed on the outside of the wall 3, once again in a position peripheral with respect to the passage 11, is a second hydraulic connection member 13 for the fluid to be heated. Preferably, also the member 13 is fixed in the proximity of a corner of the wall 3, in a purposely provided radial portion of the deep-drawn portion 11*a*. The positioning illustrated of the member 12 in the region of the wall 3, as well as that of the member 12, must on the other hand be understood as merely an example. The connection members 12 and 13 can, if need be, formed in a single body.

Figure 13:
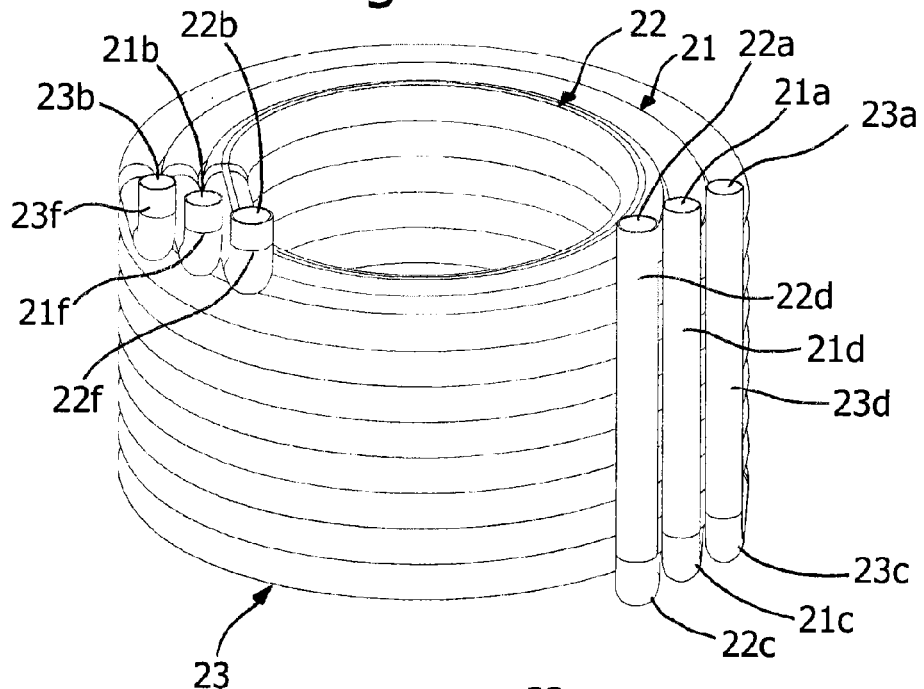
FIGS. 13 and 14 are perspective views, from different angles, of a set of coiled tubes of the heat exchanger of FIGS. 1 and 2.
Figure 14:
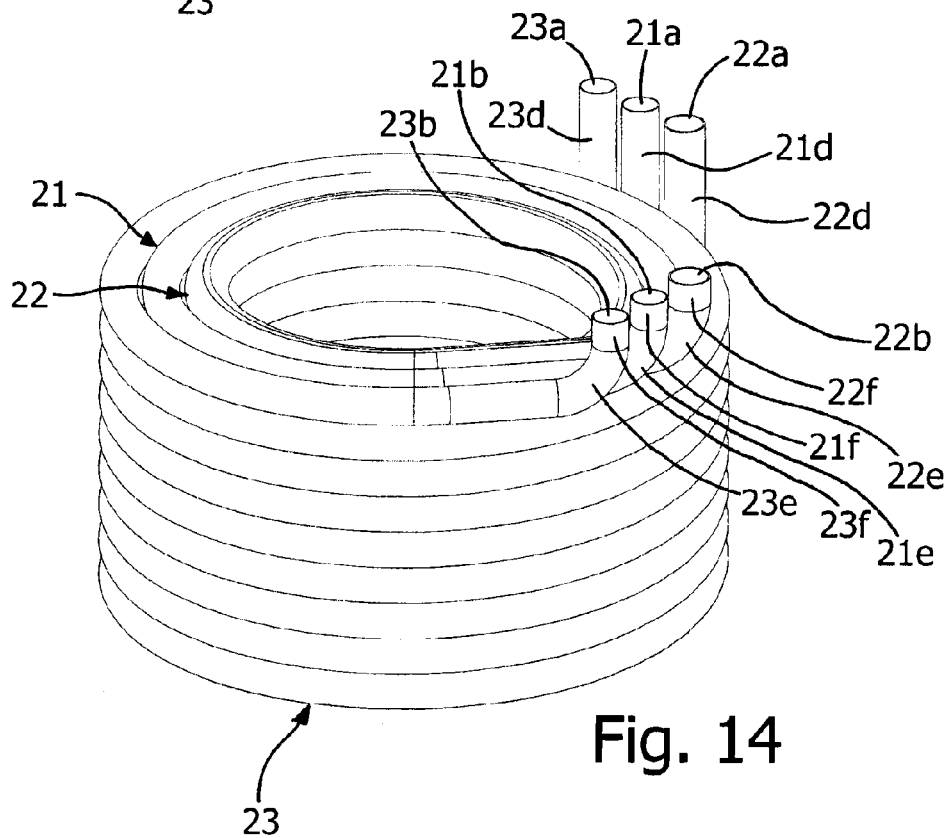
Figure 15:
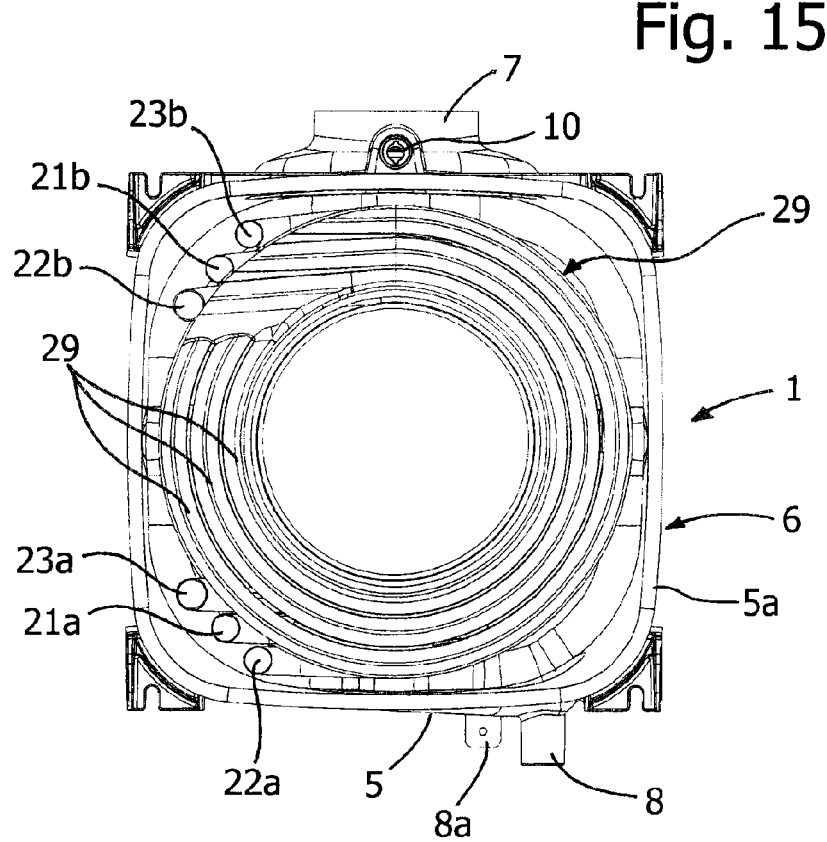
FIGS. 15 and 16 are a front view and a rear view of the heat exchanger of FIGS. 1 and 2, with a front wall removed and a casing body removed, respectively.

The casing 2 houses a heat-exchanger unit, which, in the first embodiment considered herein, comprising a plurality of coiled tubes, substantially coaxial and defining a heat-exchange path for the liquid. The aforesaid heat-exchanger unit, which is designated as a whole by 20 in FIGS. 4-8, comprises a first coiled metal pipe or tube and a second coiled metal pipe or tube, designated by 21 and 22 respectively, for example in FIGS. 4, 5 and 9 and 10. The tubes 21 and 22, which are for example made of steel, have turns of different diameter, where the tube 22 forms a helix that extends within the helix formed by the tube 21, as may be seen in FIGS. 4 and 5. In a preferred embodiment of the invention, such as the one represented in the aforesaid figures, the unit 20 further includes at least one third coiled metal pipe or tube, designated by 23. In the example shown the tube 23, which is for example made of steel, has turns of a diameter larger than that of the turns of the tube 21, so as to form a helix within which there extends the helix formed by the tube 21. Each tube 21-23 of the plurality has a first end 21*a*, 22*a*, 23*a* and a second end 21*b*, 22*b* and 23*b* (FIGS. 13 and 14).

In one embodiment (not represented), where just two tubes are provided, such as the tubes 21 and 22, these have substantially the same section of passage and are connected in series to one another, for example by way of a U-shaped connector or the like, i.e., the end 21*b* of the tube 21 (which in this case functions as outlet of the tube) is connected to the end 22*b* of the tube 22 (which in this case functions as inlet of the tube). It is on the other hand possible, according to other embodiments (not represented), to provide a heat-exchanger unit 20 where just two tubes, such as the tubes 21 and 22, operate in parallel. In further embodiments, such as those described hereinafter with reference to FIGS. 27-30 and 31-34, the unit 20 can include a single pipe, such as the pipe 22.

In the first embodiment, where the three tubes 21-23 are provided, the tubes 21 and 23 are in parallel to one another and in series to the tube 22, i.e., the ends (that here function as outlets) 21*b* and 23*b* of the tubes 21 and 23 are connected to the end (that here functions as inlet) 22*b* of the tube 22. This connection of the two outermost tubes 21 and 23 to the innermost tube 22 is provided via the aforesaid second hydraulic connector 13, described hereinafter, which in this case is configured as a header or manifold member. In the first preferred embodiment, with the three tubes, the section of passage of the tube 22 is larger than the section of passage of the tube 21 and larger than the section of passage of the tube 23, which have preferably—but not necessarily—the same section of passage. In other embodiments, the three tubes 21, 22 and 23 can possibly have the same diameter or section of passage, even though said embodiment has a slightly lower level of performance. It should be noted that the unit 20 could even include more than three coaxial coiled tubes.

In condensation heat exchangers of the type with a number of coaxial helices, the preponderant part of the heat generated through a burner (approximately 80%) is transferred to the tube defining the innermost helix. The solution proposed, with an innermost tube 22 of larger diameter supplied by two tubes in parallel 21 and 23 of smaller diameter makes it possible to achieve a high efficiency, guarantee an adequate flowrate of fluid, and keep the dimensions of the unit 20, and hence of the heat exchanger 1, as a whole compact.

Practical tests conducted by the applicant have made it possible to ascertain that—in the case of applications of the heat exchanger 1 to boilers for domestic use—very efficient operation can be obtained with tubes 21 and 23 having a section of passage corresponding to a diameter comprised between approximately 12 mm and approximately 20 mm, in particular approximately 16 mm, and with a tube 22 having a section of passage corresponding to a diameter comprised between approximately 14 mm and approximately 22 mm, in particular approximately 16 mm.

In a particularly advantageous embodiment, the three tubes 21-23 have, in cross section, a shape such that the respective helices will have substantially the same pitch. This solution is particularly advantageous for production purposes, for the reasons that will be explained hereinafter.

Figure 4:
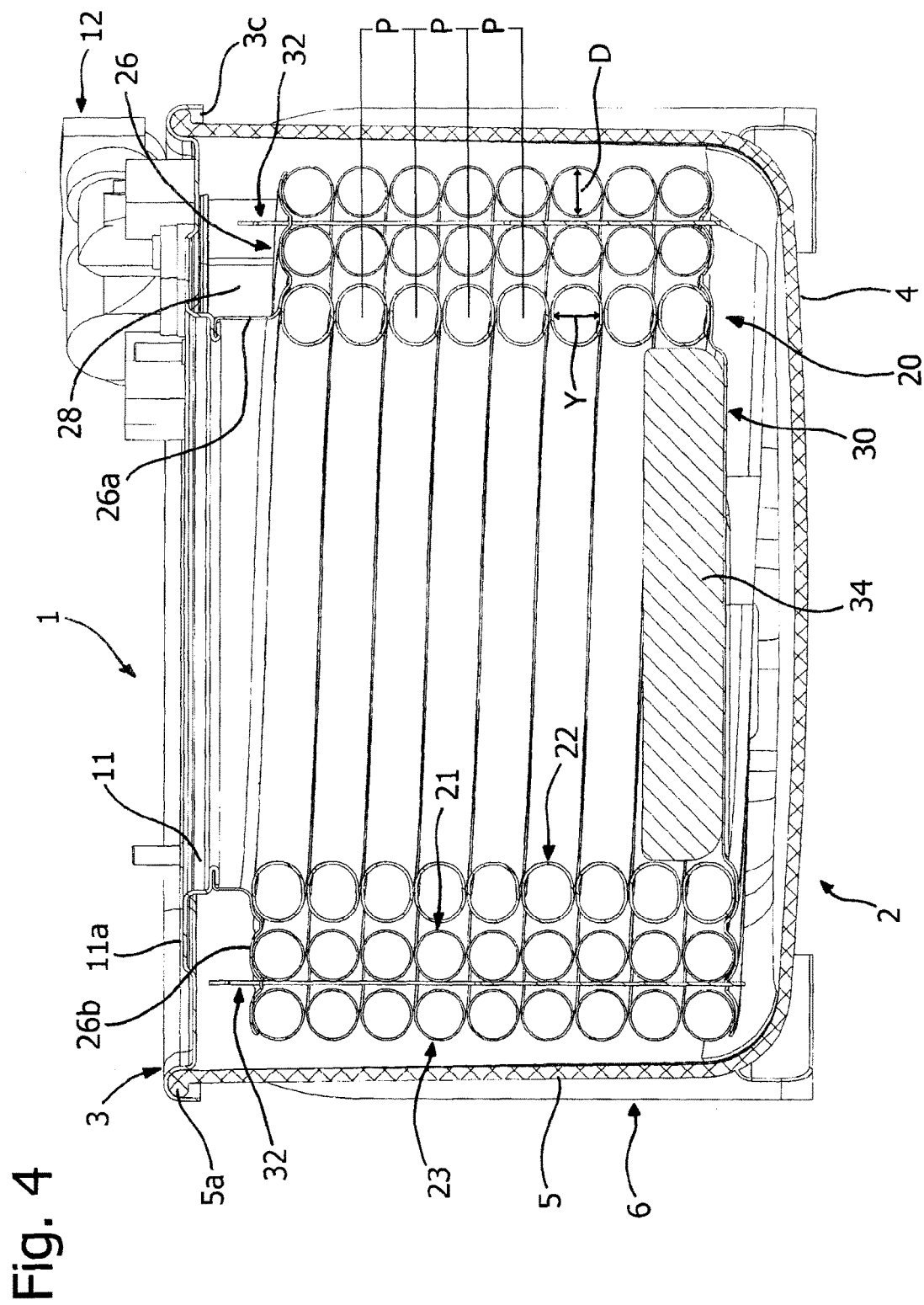
FIGS. 4 and 5 are sections according to the lines IV-IV and V-V of FIG. 3, at an enlarged scale.
Figure 5:
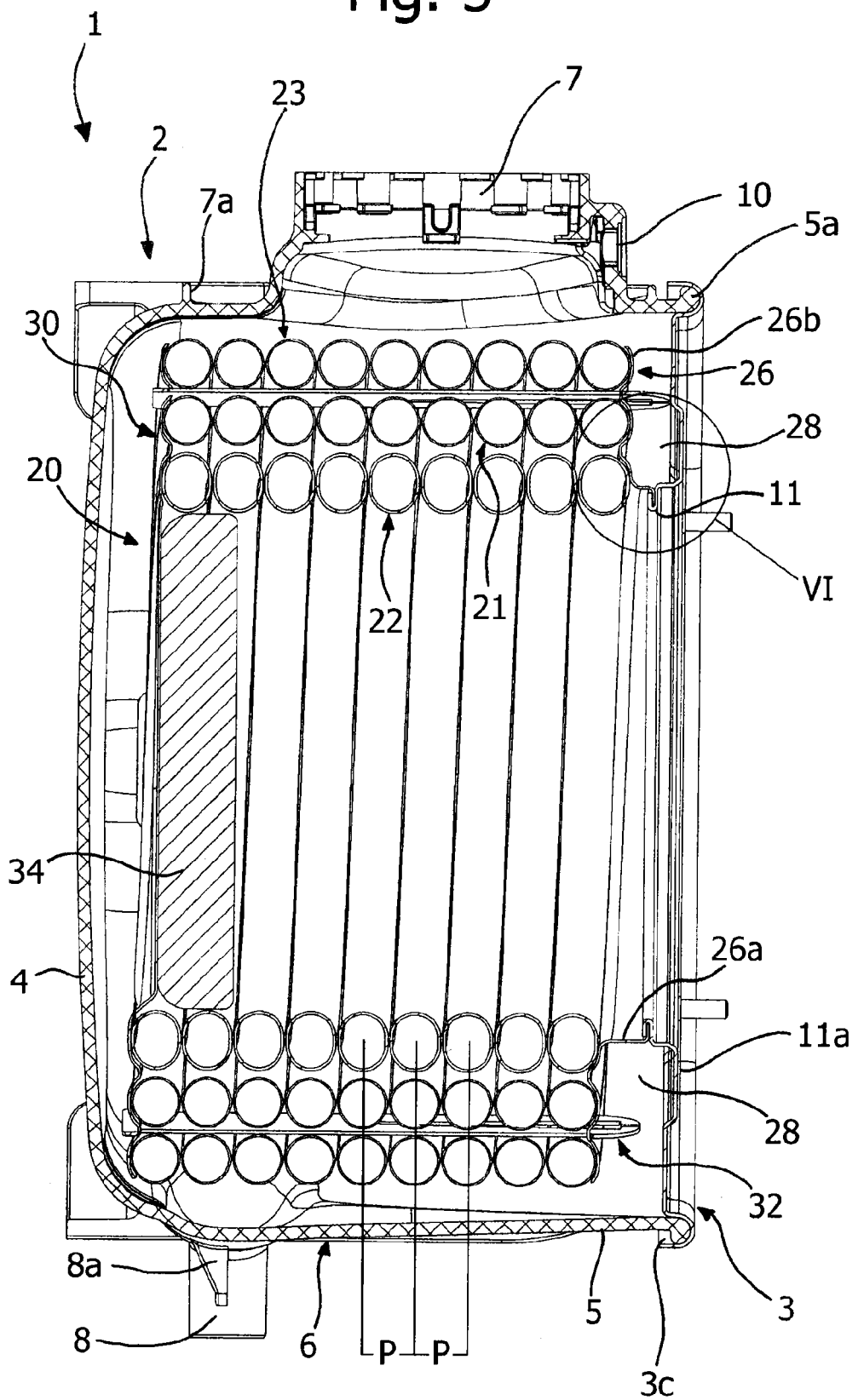

As may be seen, for example, in FIGS. 4 and 5, in the embodiment exemplified, the tubes 21 and 23 have a generally circular cross section, whilst the tube 22 has a generally ovalized or squashed cross section. As may be noted in FIG. 4, the ovalized cross section of the tube 22 has a smaller axis Y, generally parallel to the axis of the corresponding helix, which substantially corresponds to the diameter D of the circular cross section of the tubes 21 and 23: in this way, a constant pitch P is obtained for the three helices. Of course, the same result can be obtained with different shapes of cross section of the tubes 21-23. According to one embodiment (not represented), the tube 22 defining the internal helix of the unit 20 has a substantially circular cross section, whilst the tube 21 or tubes 21 and 23 have a section of passage smaller than that of the tube 22, which is generally ovalized or squashed. In such a variant, hence, the generally ovalized or squashed cross section of the tube 21 or tubes 21 and 23 has a major axis, generally parallel to the axis of the corresponding helix, which substantially corresponds to the diameter of the circular cross section of the second tube 22.

Thanks to the constant pitch P—and as may be noted in FIGS. 4 and 5—the axial dimension of the helices formed by the tubes of the unit 20 is the same (basically, the three helices are of the same height); for the same reason, also the number of turns of the various helices is the same.

The distance between the turns of each tube is preferably the same. For this purpose, in one embodiment, each coiled tube has suitable means for keeping the respective turns at the right distance, which is preferably constant along the development of the helix itself. In a particularly advantageous embodiment, these means are constituted by localized portions of the tubes themselves, shaped to function as spacers. Said localized portions can be obtained via deformation of the corresponding tube, in particular according to the teachings of WO 2005/080900.

Once again from FIGS. 4 and 5 it may be noted how, in the heat exchanger 1, the helices formed by two adjacent tubes are set at a distance apart from one another so that defined between said two tubes is a substantially cylindrical gap. For this purpose, the turns of each helix preferably have the same diameter. From said figures it also emerges that the gaps defined between the turns of one helix substantially face or are aligned to those of the adjacent helix (i.e., the turns of the adjacent helix do not face the gaps of a helix, as, for example, in the aforementioned EP-A-1 813 882). Practical tests conducted by the present applicant have made it possible to ascertain that such an arrangement guarantees in any case efficient operation of the heat exchanger 1.

According to a preferential characteristic of the invention, in the first embodiment, the inlet 21a of the tube 21 and the outlet 22a of the tube 22—or, as in the preferred embodiment exemplified—the inlets 21a, 23a of the tubes 21, 23 and the outlet 22a of the tube 22 are substantially at the end wall 3 of the casing 2, as described hereinafter.

Figure 7:
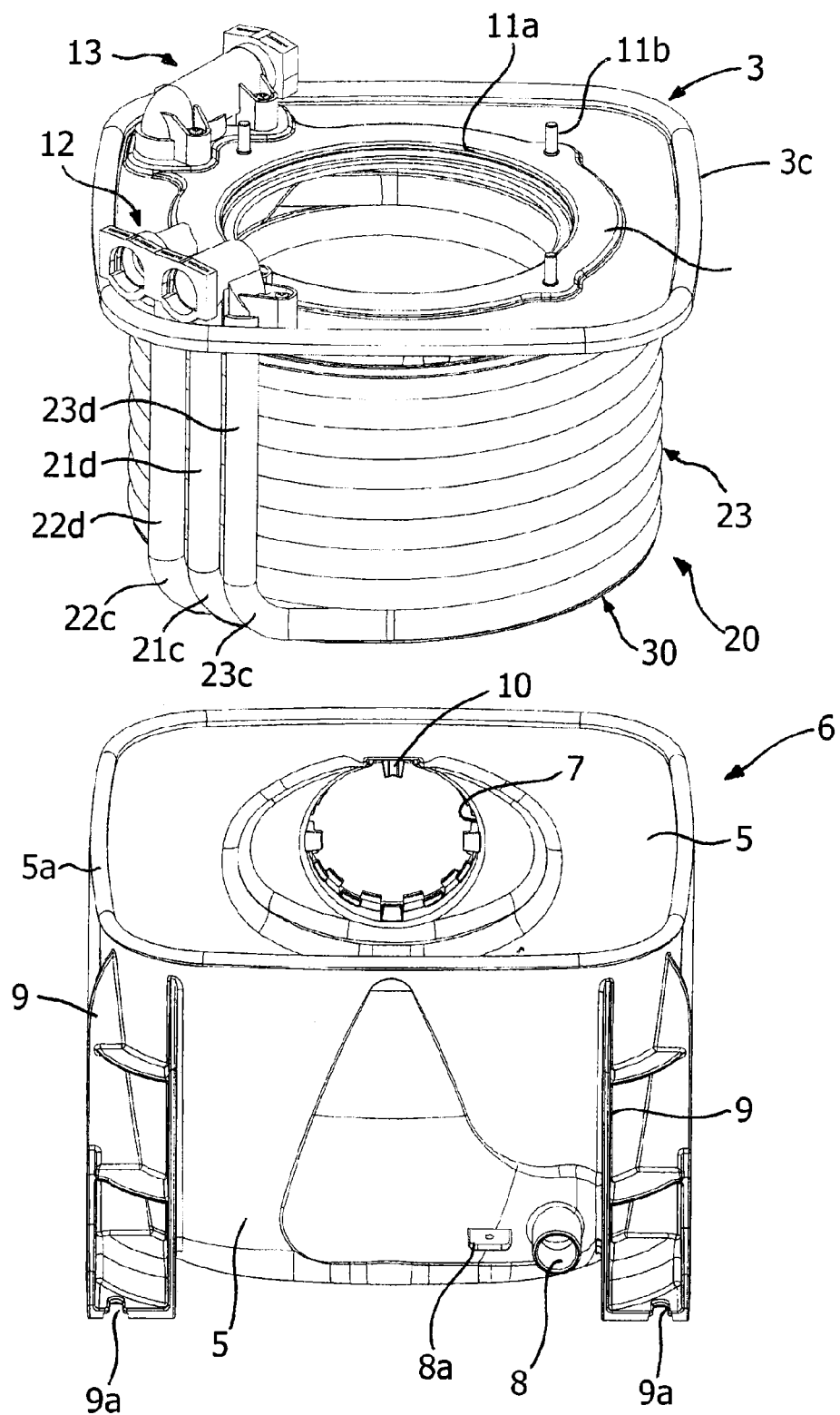
FIGS. 7 and 8 are partially exploded views, from different angles, of the heat exchanger of FIGS. 1 and 2.
Figure 8:
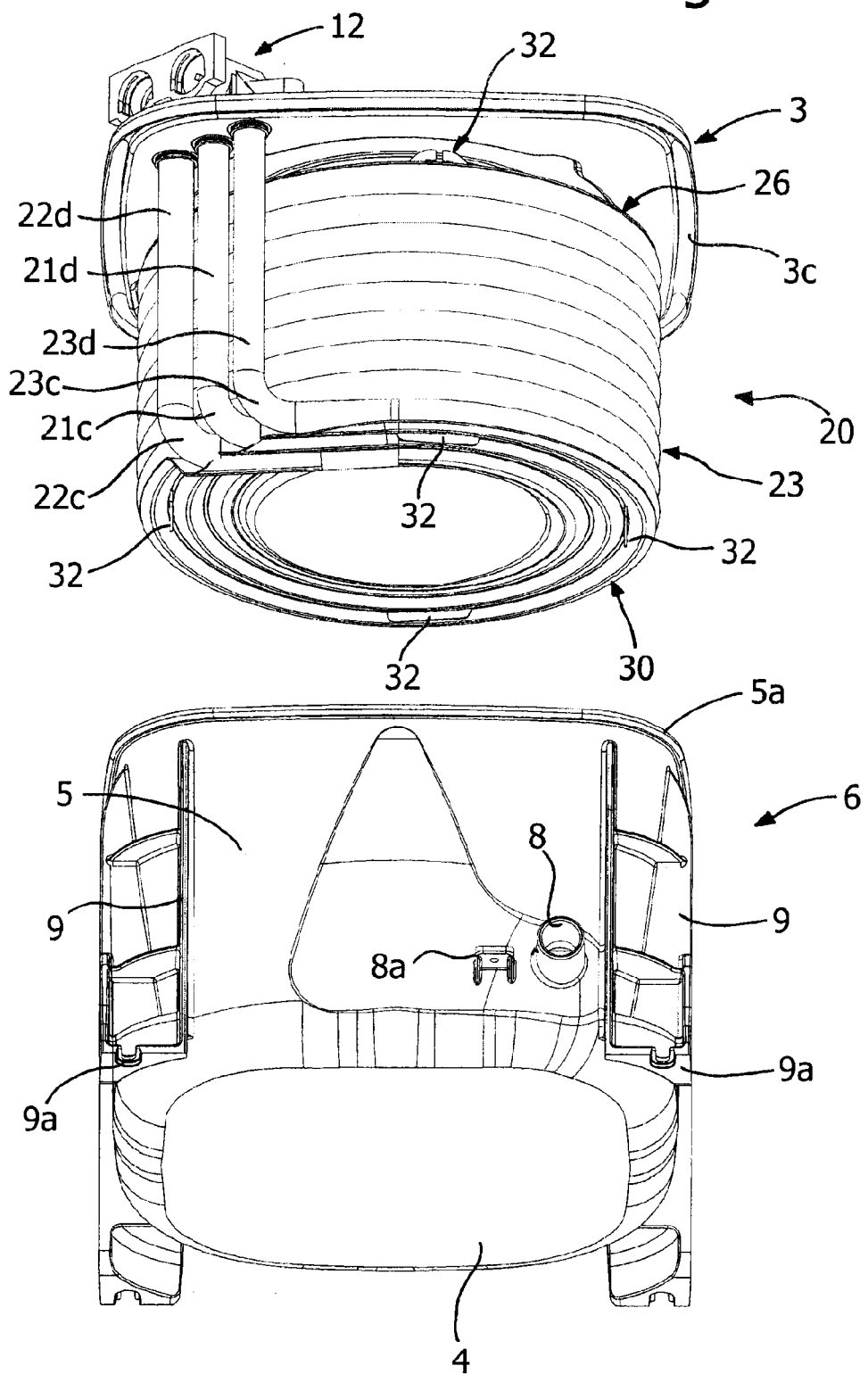
Figure 9:
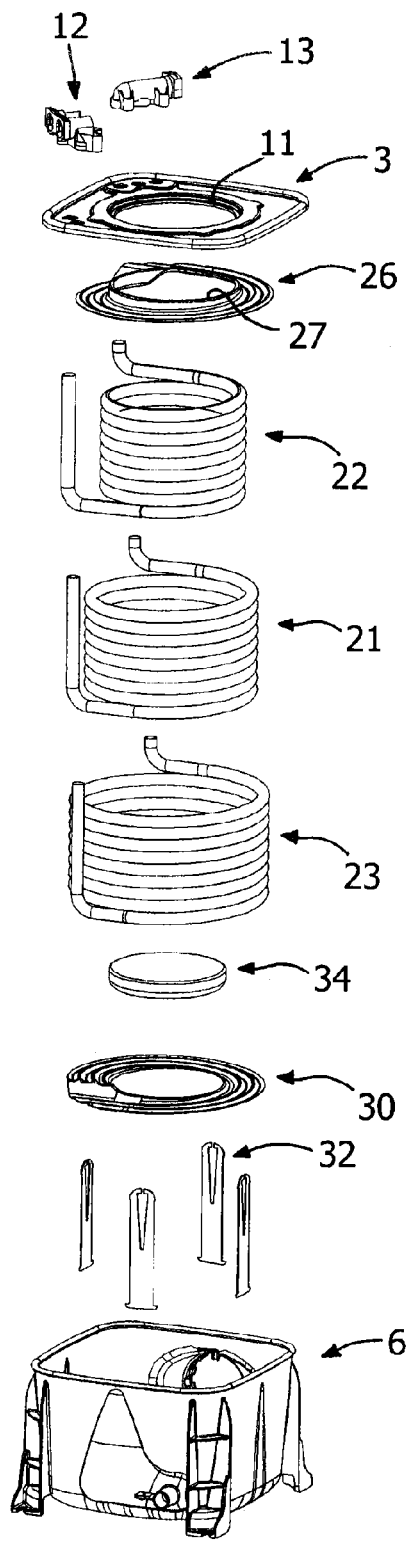
FIGS. 9 and 10 are exploded views, from different angles, of the heat exchanger of FIGS. 1 and 2, at a reduced scale.
Figure 10:
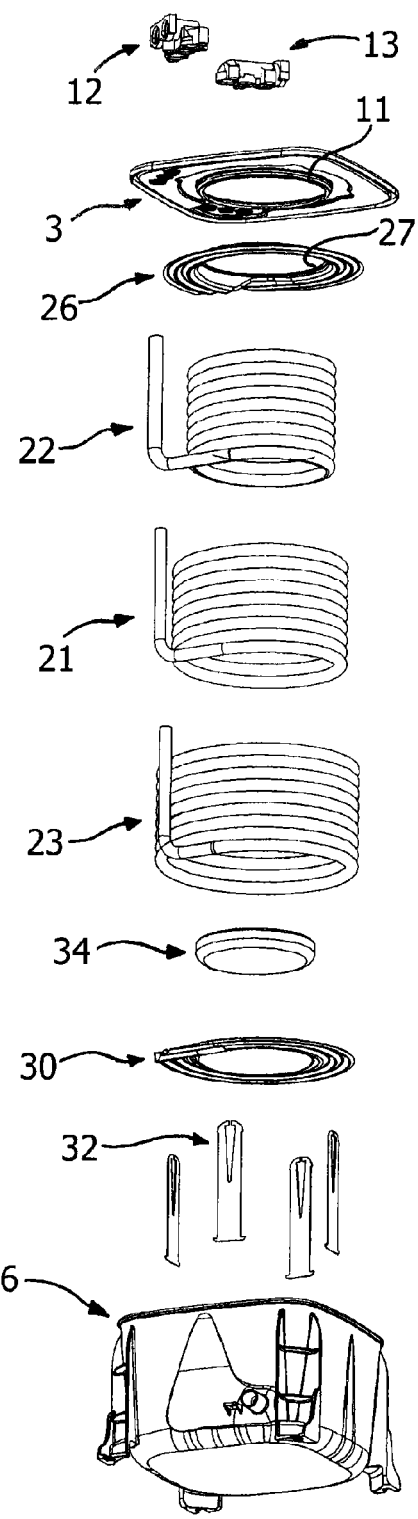
Figure 11:
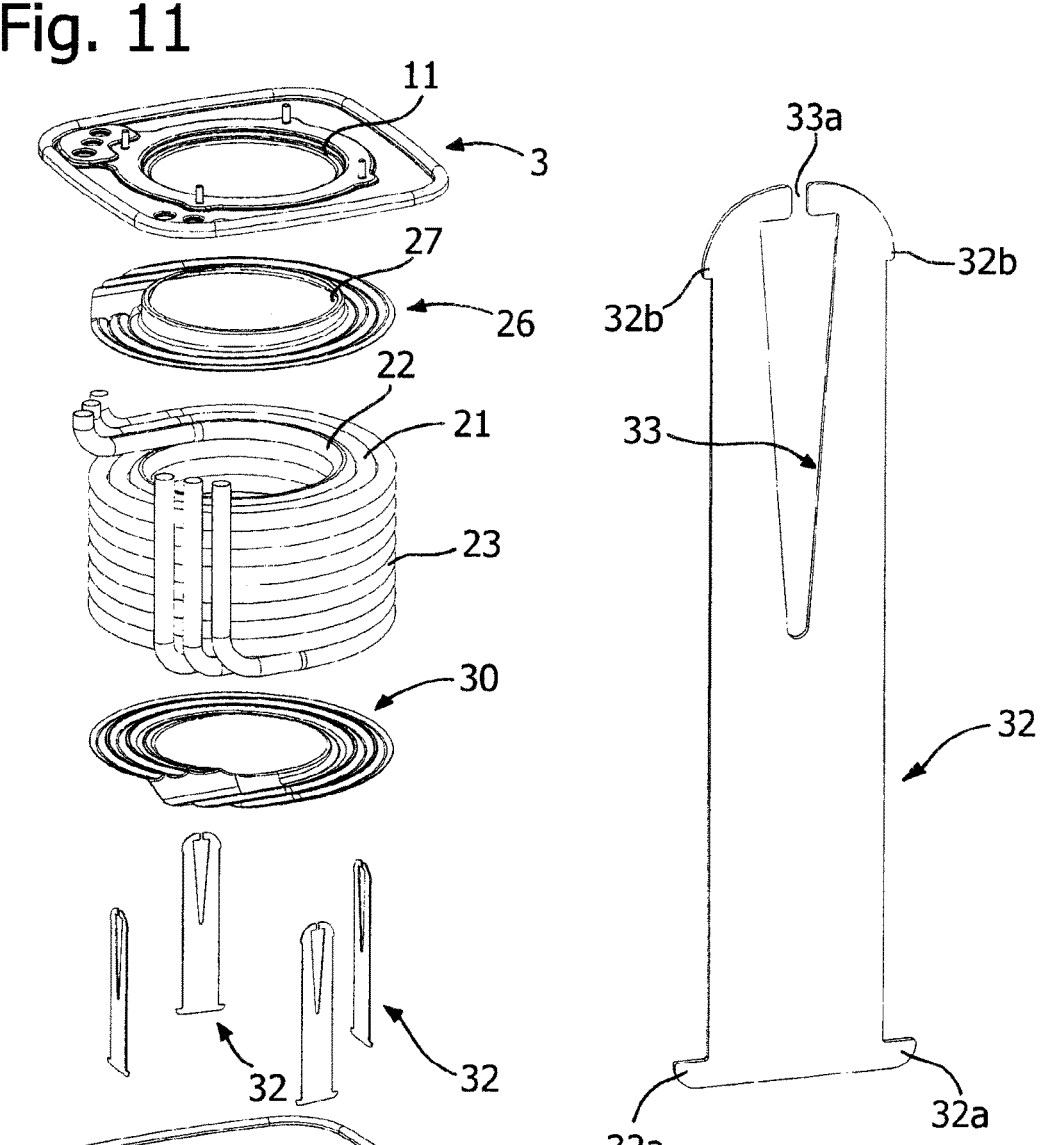
FIG. 11 is a partially exploded view of the heat exchanger of FIGS. 1 and 2.

For said purpose, and as may be clearly seen, for example, in FIGS. 7 and 13, each tube has a first intermediate bend at an angle, designated by 21c, 22c and 23c. In this way, in the tubes 21 and 23—when both are present—respective first stretches of tube, designated by 21d and 23d, are defined, which extend in a generally axial direction or a direction of height of the corresponding helix; likewise, defined in the tube 22 is a similar first stretch of tube, designated by 22d, which also extends in a generally axial direction or a direction of height of the corresponding helix.

Figure 17:
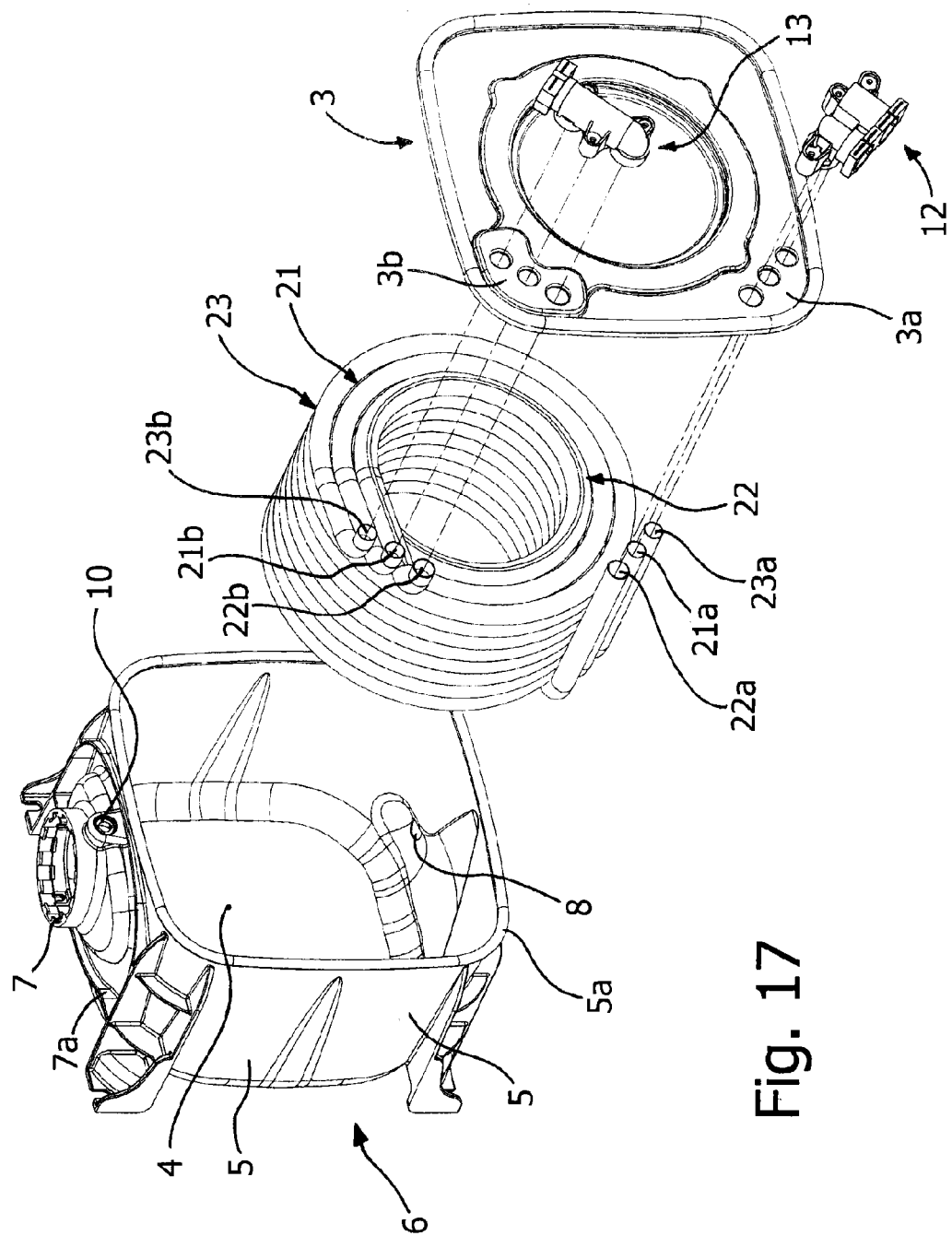
FIG. 17 is an exploded view of the heat exchanger of FIGS. 1 and 2, with some components removed.

In a preferred embodiment, the aforesaid stretches of tube 21d, 22d and 23d (if envisaged) are substantially rectilinear, as well as being substantially parallel to one another and to the axis of the helix formed by the respective tube (of course, the aforesaid stretches could even be at least slightly inclined with respect to the axis of the helix). Preferably, moreover, the aforesaid stretches of tube 21d, 22d and 23d (if envisaged) extend on the outside of the helix formed by the outermost tube 23, and/or reach substantially one and the same area 3a (see, for example, FIG. 17) of the wall 3 of the casing 2, i.e., the area where the connection member 12 is mounted. As may be seen, moreover, in the preferred embodiment exemplified, the aforesaid stretches extend starting from the ends of the helices opposite to the wall 3 until they reach the latter. Preferably, at these ends of the corresponding helices, the tubes have a respective portion which is generally tangential, not indicated, with the bends 21c, 22c and 23c that are located between said tangential portion and the stretches in vertical 21d, 22d e 23d.

In accordance with another preferential characteristic of the invention, in the first embodiment, also the outlet 21b of the tube 21 and the inlet 22b of the tube 22—or, as in the preferred embodiment exemplified—the outlets 21b, 23b of the tubes 21, 23 and the inlet 22b of the tube 22 are located substantially at the end wall 3 of the casing 2.

For this purpose, and as may be seen, for example, in FIGS. 13 and 14, each tube has a second intermediate angled bend, designated by 21e, 22e and 23e. Defined in this way in the tubes 21 and 23—when both are present—are also respective second stretches of tube, designated by 21f and 23f, which extend in a generally axial or height direction of the corresponding helix; likewise, defined in the tube 22 is a similar stretch of tube, designated by 22f, which also extends in a generally axial or height direction of the corresponding helix. As may be noted, the stretches of tube 21d-23d and 21f-23f are substantially parallel to one another, both facing one end and the same end of the unit 20, i.e., the end that is to face the wall 3 of the casing 2. Also the stretches of tube 21f, 22f and 23f (if envisaged) are substantially rectilinear, as well as substantially parallel to one another and to the axis of the helix formed by the respective tube, and preferably extend on the outside of the helix formed by the outermost tube 23 (of course, also these stretches of pipe could be at least slightly inclined with respect to the axis of the helix). In the example, also the corresponding ends 21b-23b reach substantially one and the same area 3b (see, for example, FIG. 17) of the wall 3 of the casing 2, i.e., the area where the connection member 13 is mounted. Stretches 21f, 22f and 23f (if provided for) extend starting from the ends of the helices which are closer to the wall 3, until reaching the latter. Preferably, but not necessarily, also at said ends of the corresponding helices the tubes have a respective generally tangential portion, not indicated, with the bends 21e, 22e and 23e that are between such tangential portions and the stretches in vertical 21f, 22f e 23f. The connection of the tube 21 or tubes 21 and 23 to the tube 22 is provided via the member 13, which, as has been said, in the first embodiment functions as manifold, and is mounted at the inlet end of the tube 22 and at the outlet end of the tube 21 or the outlet ends of the tubes 21 and 23.

Figure 20:
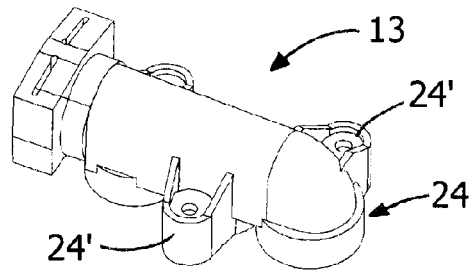
FIGS. 20 and 21 are two perspective views of a second hydraulic connection member of the heat exchanger of FIGS. 1 and 2.
Figure 21:
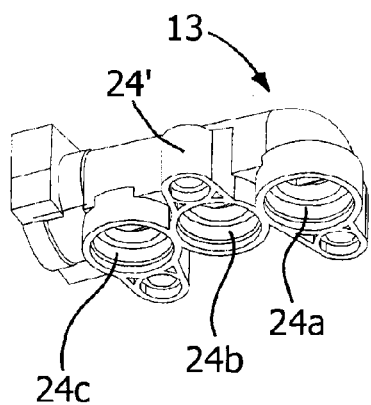

In one embodiment, the aforesaid manifold member 13 comprises a body, for example obtained by casting, designated by 24 in FIGS. 20 and 21. This body 24, which is preferably but not necessarily made of metal material, includes three mouths 24a, 24b and 24c, having diameters designed to receive the ends 21b-23b of the tubes of the unit 20, which communicate with one and the same pipe inside the body 24, designated by 25 in FIG. 22: as may be noted, the surface of the pipe 25 opposite to the mouths 24a-24d has a generally curved profile, which, in the assembled condition, faces the ends 21b-23b of the tubes 21-23.

Advantageously, operatively associated to the body 24 are sealing means, for example constituted by one or more gaskets, configured to obtain a seal coupling of the body 24 with respect to the ends 21b-23b of the tubes 23, and possibly with respect to the wall 3 of the casing 2.

The body 24 of the manifold member 13 then defines bracket formations 24', provided with corresponding through holes, used for fixing the body itself to the wall 3, via threaded means, for example, screws.

It will thus be appreciated that, thanks to this arrangement, the sealed fluidic coupling of the ends 21b-23b of the tubes 21-23 to the manifold member 13 does not involve welds.

In a preferred embodiment of the invention, the heat-exchanger unit 20 includes at least one first end plate, designated by 26, which may be seen, for example, in FIGS. 4-6, 9-11 and 15; in the assembled condition of the heat exchanger 1, this plate 26 faces the wall 3 of the casing 2, in contact therewith. The plate 26 can be obtained, for example, via shearing and deep drawing from sheet metal, and has a respective central passage, designated by 27 in FIGS. 9-11 and 15, that is to be used for connection to the passage 11 of the wall 3. In order to connect the two passages 11 and 27, at least one of them is defined by a generally tubular portion of the wall 3 or of the plate 26. In the example represented, said generally tubular portion belongs to the plate 26 and is designated by 26a in FIGS. 4-6; on the other hand, as has been said, also the inner edge of the wall 3 that defines the opening 11 is slightly deep-drawn inwards, as may be seen in FIGS. 4-6). In the assembled condition, the upper edge of the tubular portion 26a of the plate 26, generally flange-shaped, is sealingly fixed to the edge of the wall 3 that defines the opening 11. In a particularly advantageous embodiment, and as may be seen in FIG. 6, said fixing is obtained via seaming, i.e., bending back or riveting the edge of the opening 11 on the flanged edge of the portion 26a. Advantageously, said type of coupling avoids the need for welding operations for coupling together the parts in question.

As may be noted, the plate 26 also has a generally annular flanged portion 26b (FIGS. 4-6), from which the tubular part 26a rises, where the end turns of the tubes 21-23 rest on this flanged portion 26a.

In the assembled condition, the annular portion 26b of the plate 26 is set at a distance apart from the wall 3 of the casing so that defined between the wall and the plate is a generally annular gap. The presence of this gap, as may be seen, for example, in FIGS. 4-6, where it is designated by 28, enables containment of the temperature of the wall 3 even in the absence of insulating masses, this considering the fact that the plate 26 is joined to the wall 3 only at the top edge of the tubular portion 26a and that the end turns of the tubes are not directly in contact with the wall 3. It will moreover be appreciated that, in the course of operation of the heat exchanger 1, the fumes that, through the gaps between the turns of the tubes 21-23, can reach the outside of the unit 20, and then the gap 28, are substantially dry and have already yielded the majority of their heat to the tubes, thereby enabling a corresponding cooling in the area of interface between the wall 3 and the plate 26.

As has been said, in the assembled condition, the end turns of the tubes 21-23 are in contact with the plate 26. Advantageously, the plate 26 is shaped so as to define positioning seats or depressions, some of which may be seen in FIG. 15, designated by 29, for said end turns of the helices formed by the tubes 21-23. In the example, these seats 29 have a substantially arched prevalent part and a substantially rectilinear terminal part, which develops in an approximately tangential direction. The seats 29 contribute to ensuring proper positioning of the aforesaid end turns, and hence of the corresponding helices; the aforesaid tangential stretches of the seats 29 ensure positioning of respective rectilinear portions of the tubes as far as the outside of the helix formed by the tube 23 (see FIGS. 13-15), there being provided at the end of said portions of tube the second intermediate bends at an angle 21e-23e described previously.

Figure 16:
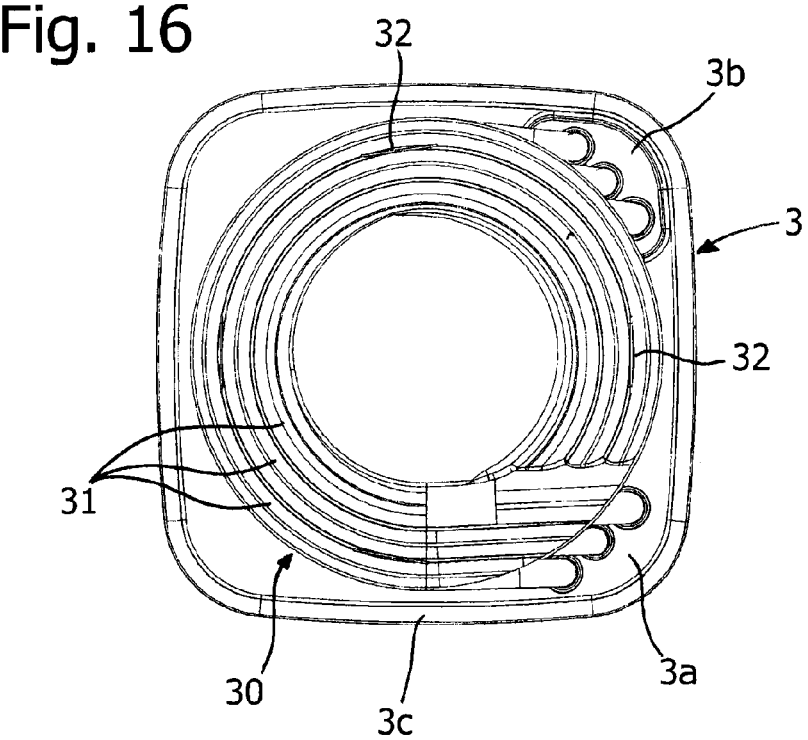

In the preferred embodiment of the invention, the unit 20 also comprises a second end plate, designated by 30 in Figures and 13, 4-6, 8-11 and 16, built in a way substantially similar to the plate 26. In the assembled condition, the plate 30 faces the wall 4 of the casing 2 and is set at a distance therefrom. Resting on the plate 30 are the turns of the ends of the helices opposite to the wall 3. Also the plate 30 is provided with corresponding positioning seats 31, as may be seen, for example, in FIG. 13, having a configuration and functions similar to those of the seats 29 of the plate 26. Also in this case, the tangential stretches of the seats 31 ensure positioning of respective rectilinear portions of the tubes as far as towards the outside of the helix formed by the tube 23, there being provided at the ends of said portions the first intermediate angled bends 21c, 22c and 23c (see, for example, FIGS. 8 and 16).

According to a preferential characteristic of the invention, the heat-exchanger unit 20 is supported by the end wall 3 of the casing 2, that is by the same wall where the inlet and outlet for the liquid that is to flow through the heat exchanger 1 are located.

For this purpose, the unit 20 preferably includes supporting elements in the form of tie-rods or uprights, which are supported, at one end, by the wall 3 and that support the set of tubes 21-23 at the other end. In the non-limiting example illustrated, the aforesaid tie-rods—represented in FIGS. 4-5 and 9-11, where they are designated by 32—are supported indirectly by the wall 3 by means of the plate 26 and support the set of tubes 21-23 by means of the plate 30.

As mentioned previously, the helices formed by two adjacent tubes of the unit 20 are set at a distance apart from one another in such a way as to define between them a substantially cylindrical gap. Preferably, the tie-rods 32 extend precisely in this gap, substantially in the axial direction of the helices formed by the tubes 21-23, as may be seen, for example, in FIG. 4. This solution enables containment of the overall lateral dimensions of the unit 20 and axial stabilization of the set of helices.

Figure 12:
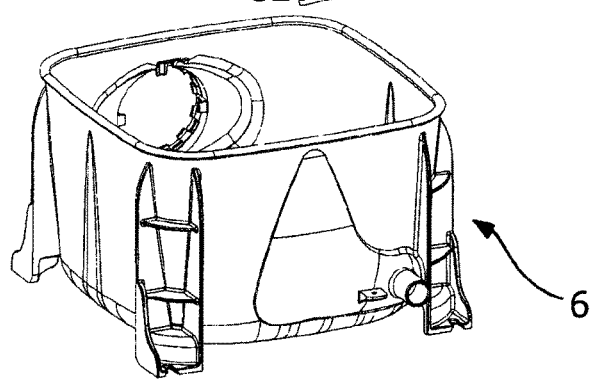
FIG. 12 is an enlarged detail of FIG. 11.

The tie-rods 32 are preferably formed starting from sheet metal and have a generally flattened configuration. For coupling with the tie-rods, the plates 26 and 30 have respective slits, which are not visible in the figures, but the position of which can be inferred, for example, from FIGS. 4, 5 and 8. As may be seen in particular in FIG. 12, the tie-rods 32 have a substantially rectilinear configuration and present a lower end widened, i.e., having two lateral projections 32a. Also the upper end, which has a generally rounded profile, has a widening, i.e., two projections 32b, defining a step. The body of the tie-rods 32 is blanked so as to present an axial cut 33, which extends from the upper end as far as an intermediate region of the tie-rod. In the example exemplified, the cut 33 prevalently has the shape of an isosceles triangle, with the smaller side close to the upper end: as may be noted, from the aforesaid smaller side 33 there departs also a stretch of cut 33a that divides the upper end into two substantially symmetrical parts.

For the purposes of assembly, the tie-rods 32 are inserted from beneath through the corresponding slits provided in the bottom plate 26, which have a width smaller than the distance between the bottom projections 32a, with the tie-rods themselves positioned in the aforesaid gaps of the set of tubes 21-23. In said condition, the upper ends of the tie-rods project at the top from the unit 20, and slid over them are the corresponding slits of the top plate 26, which have a width smaller than the distance between the upper projections 32b. Next, the plate 26 is forced downwards: given the generally curved conformation of the upper end of each tie-rod 32, and thanks to the presence of the cut 33, with the corresponding axial stretch 33a, the two substantially symmetrical portions of the upper end can slightly approach one another, substantially in an elastic way, so that also the upper projections 33b can pass through the slits in the plate 30. When the projections 32b have passed beyond the slit, the two portions of the upper end can once separate in elastically, with the steps defined by the projections 31b themselves that bear upon the upper surface of the plate 26; in this way, a substantially snap-action coupling of the tie-rods to the top plate 26 is provided, with the set of tubes 20 that is packed between the two plates 26 and 30 thanks to the tie-rods 32.

It will be appreciated then that, in a particularly advantageous embodiment, also assemblage of the unit 20, i.e., of the plates 26, 30, of the tubes 21-23 and of the tie-rods, can be performed in the absence of welds.

Figure 18:
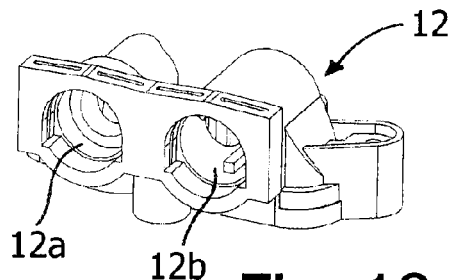
FIGS. 18 and 19 are two perspective views of a first hydraulic connection member of the heat exchanger of FIGS. 1 and 2.
Figure 19:
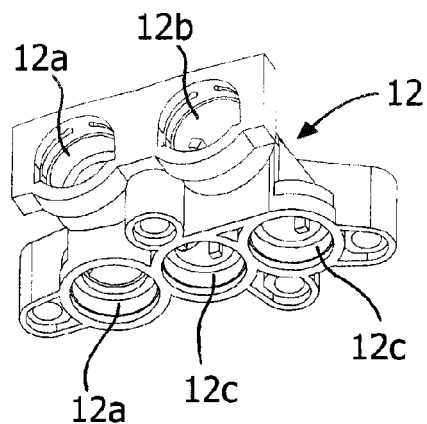

Illustrated in FIGS. 18 and 19 is the connection member 12, which is secured to the outside of the wall 3, in the area 3a where the ends of the tubes 21-23 that are to be connected towards the outside are located. The member 12 has a metal or plastic body that defines two ducts 12a and 12b. The duct 12a is to be connected to the end or outlet 22a of the tube 22, and has a section of passage substantially similar to that of the latter; the duct 12b has an inlet, with a section of passage substantially the same as that of the duct 12a, and said duct 12b then branches off into two outlets 12c, having sections of passage substantially like those of the tubes 21 and 23, said outlets 12c being designed for connection with the ends or inlets 21a and 23a of said tubes. Of course, the section of passage or diameter of the inlet of the duct 12a and of the outlets 12c can be at least slightly larger than the ends of the corresponding tubes 22 and 21, 23, respectively, in order to enable positioning of corresponding sealing means. Also the body of the connection member 12 preferably defines bracket formations (not indicated), provided with corresponding through holes, used for fixing of the body itself to the wall 3, via threaded means, for example, screws.

Production of the components of the heat exchanger 1 is simple. As has been said, the body 6 of the casing can be obtained by moulding of thermoplastic material, such as polypropylene. The wall 3, the plates 26 and 30, and the tie-rods 32 can be obtained starting from sheet metal, via operations of shearing and/or deformation, using techniques consolidated in the sector. Also the metal tubes 21-23 can be obtained in the configurations described using techniques in themselves known in the sector. Likewise simple is production of the bodies 24 and 25 of the manifold member 13 and of the connection member 12.

Also assemblage of the heat exchanger 1 is very simple and automatable at least in part.

As has been said, the tie-rods 32 are inserted from beneath into the corresponding slits in the plate 30. The helices formed by the three tubes 21-23 are set coaxially on the plate 30, in a way congruent with the shape of the corresponding seats 31 (FIG. 16) and in such a way that the tie-rods 32 will extend in one or more of the gaps defined between adjacent helices. A sealant material can be set between the turns of a first end of the helices and the plate 30, for example a silicone material resistant to high temperatures.

Then fitted over the top end of the tie-rods 32 are the corresponding slits of the plate 26, previously seamed to the wall 3 (see what has been described with reference to FIG. 6). The component constituted by the wall 3 and by the plate 26 is then pushed downwards in order to bring the plate 26 into contact with the turns of the second ends of the helices, in a way congruent with the shape of the seats 29 (FIG. 15), and to obtain the aforesaid snap-action coupling. Preferably, before positioning and fixing of the assembly constituted by the wall 3 and the plate 26, inserted with interference in the smaller opening of the helix formed by the tube 22 is an insulating body (indicated in FIGS. 4-5 and 9-10 and 40), for example made of ceramic fibre or vermiculite. Also in this case, between the turns of the second ends of the helices and the plate 26 there can be set a sealant of the type referred to previously. A further insulating body of a nature similar to that of the body 34 can be set also on the opposite side, in an area corresponding to the plate 26 and so as to envelop the burner; a further body of this sort is exemplified in FIG. 40, where it is designated by 34'.

In this way, the tubes 21-23 are packed between the plates 26 and 30; as has been said, the seats 29 and 32 of the plates 26 and 30, in combination with the tie-rods 32, guarantee proper positioning of the helices. It may be noted, in this regard, that the plates 26 and 30 are preferably shaped also to guarantee an alignment between the turns of the various helices in a direction substantially orthogonal to the axis of the helices themselves: for this purpose, the areas of the plates 26 and 30 in which the seats 29 and 31 are defined develops at least in part as a turn, which starts and terminates in a position corresponding to a small inclined wall (as may be seen partially in FIG. 11).

With the unit 20 thus assembled, the ends of the stretches of tube 21d-23d and 21f-23f project in height beyond the helices, as may be seen, for example, in FIGS. 13 and 14. These ends of the tubes 21-23 are then inserted in respective holes provided in the areas 3a and 3b (see FIG. 17, where the plates 26 and 30 are not represented), so as to project slightly beyond the wall 3. On the wall 3, in a position corresponding to said ends of the tubes and of the areas 3a and 3b, there are then fixed with screws or the like, and with interposition of seal rings or the like, the connection member 12 and the manifold member 13, respectively. The connection member 12 is fixed so that the forked duct 12b-12c (FIGS. 18, 19 and 22) is in communication with the ends or inlets 21a and 23a of the tubes 21 and 23, and the duct 12a is in communication with the end or outlet 22a of the tube 22. The manifold member 13 is fixed so that the mouths 24b and 24c are in communication with the ends or outlets 21b and 23b of the tubes 21 and 23, and the mouth 24a is in communication with the end or inlet 22a of the tube 22.

Figure 40:
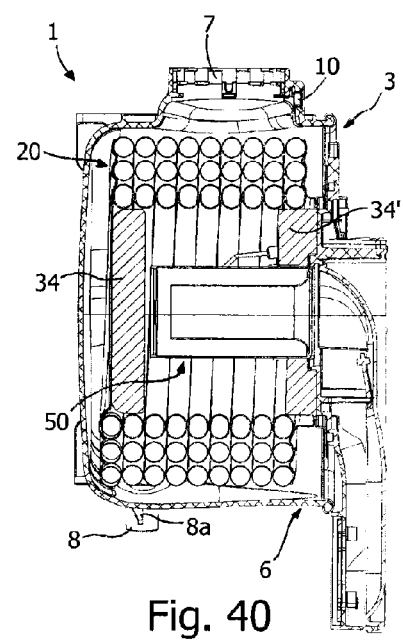
FIG. 40 is a cross section according to the line XL-XL of the heat exchanger of FIG. 39.

The assembly thus obtained can thus be inserted towards the inside of the body 6, until the peripheral edge of the wall 3 rests on the edge of the part 5. The edge of the wall 3 can be directly crimped on the edge of the part 5 (FIGS. 4-5 and FIG. 40 illustrate the coupling before and after the crimping operation, respectively). For this purpose, the edge of the part 5 of the plastic body 6 preferably has a peripheral flange projecting outwards, designated by 5a in FIGS. 4-5 and 7-8, whilst the wall 3 is shaped so as to present a peripheral seat 3c, within which the aforesaid flange 5a is inserted. The outer edge of the wall 3, in a position corresponding to said seat 3c, can then be crimped on the flange 5a, without the need of interposing any sealing element.

Figure 36:
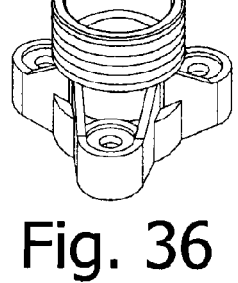
FIGS. 36 and 37 are two perspective views of a hydraulic connection member of the heat exchanger of FIG. 35.
Figure 37:
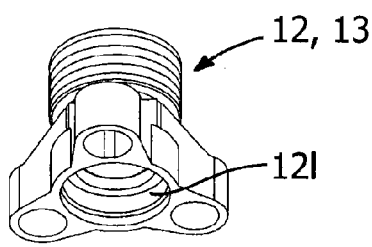
Figure 38:
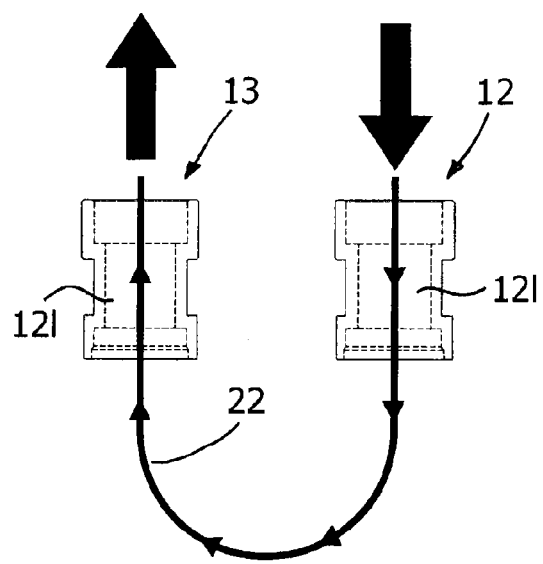
FIG. 38 is a simplified hydraulic diagram of the heat exchanger of FIG. 35.

Operation of the heat exchanger 1 according to the first embodiment will now be briefly described with reference to FIGS. 22, 36 and 37, assuming that the heat exchanger itself is to equip a domestic gas boiler. In an application of this type the first heat-exchange fluid is a heating liquid that must be made to circulate, for example, in a system of radiators, or else water of a plumbing system, and the second heat-exchange fluid is smoke produced by combustion.

Figure 22:
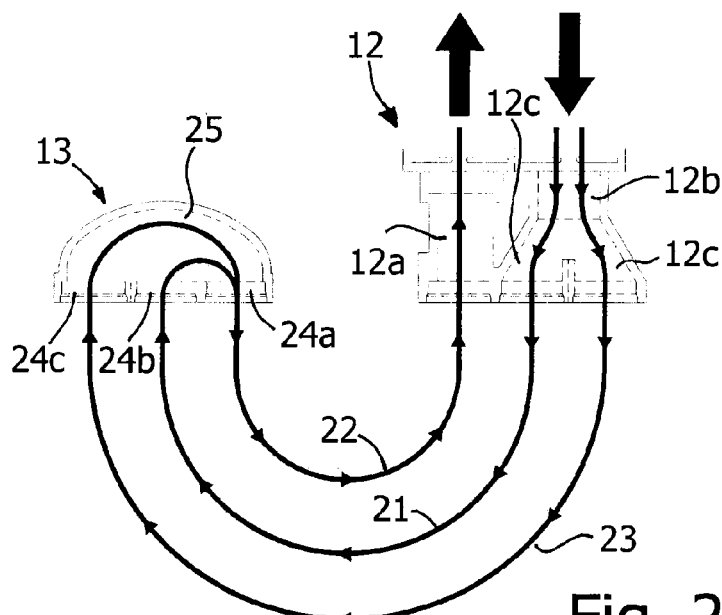
FIG. 22 is a simplified hydraulic diagram of the heat exchanger of FIGS. 1 and 2.
Figure 27:
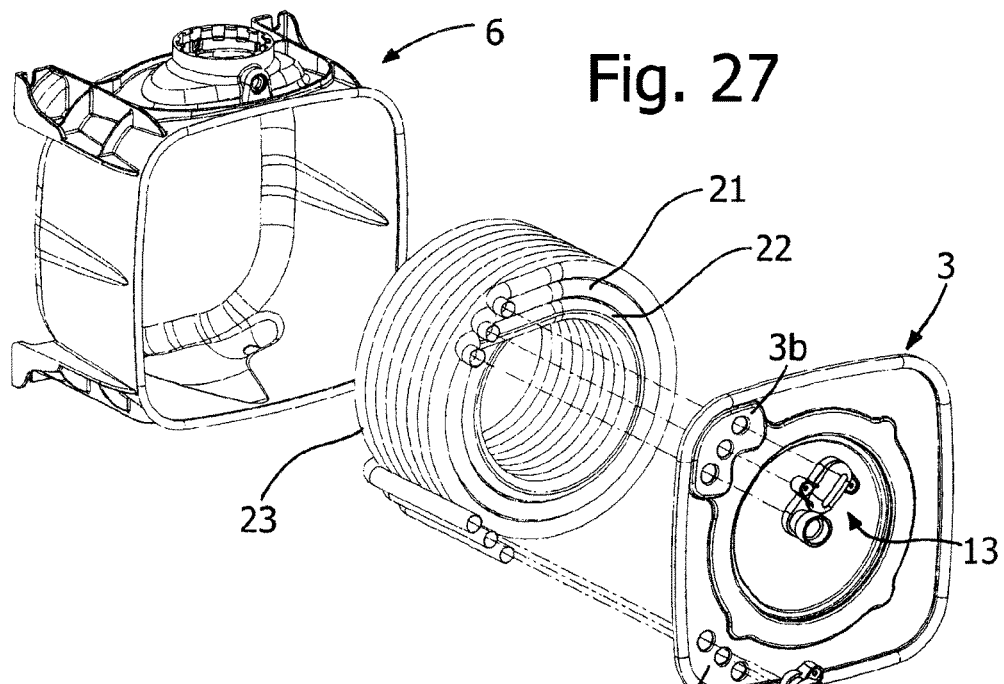
FIG. 27 is a view similar to that of FIG. 17, regarding a heat exchanger according to the invention, in a third configuration.
Figure 28:
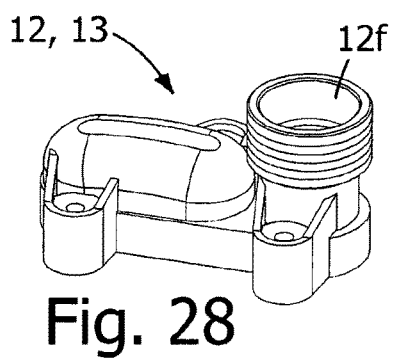
FIGS. 28 and 29 are two perspective views of a hydraulic connection member of the heat exchanger of FIG. 27.
Figure 29:
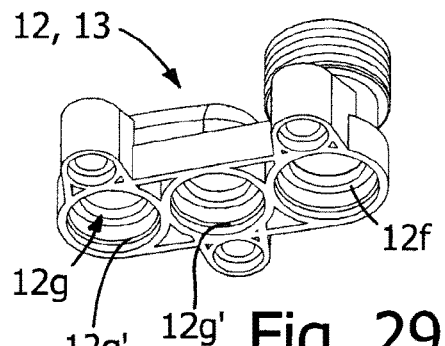

As may be seen in FIG. 22, the liquid to be heated coming from the system enters the heat exchanger 1 via the duct 12b of the connection member 12. Through the branching of the duct 12b, the liquid supplies in parallel the tubes 21 and 23, until it reaches the manifold member 13. Via the manifold member, the water leaving the tubes 21 and 23 is conveyed into the tube 22. The liquid then flows through the tube 22, i.e., the helix closest to the burner 50 of FIGS. 36 and 37, to reach the duct 12a of the connection member 12.

As a result of the two different sections of passage, and hence of the different flowrates, the liquid passes in an amount proportional to the heat-exchange capacity of the respective tube, the three pipes 21-23 operating at independent and decreasing temperatures, starting from the innermost tube 22, which is warmer, to the outermost tube 23, which is colder, thus favouring in a determining way the phenomenon of condensation of the fumes. In each tube the liquid tends to absorb a different amount of heat: the majority of the heat is absorbed by the innermost tube 22, which absorbs also the heat by irradiation generated by the burner 50, whilst the intermediate tube 21 and the outermost tube 23 absorb the residual energies of the fumes. As a result of the lower temperature of the tubes 21 and 23 it is possible to absorb a very high amount of energy from the fumes, which are increasingly impoverished and, by coming into contact with increasingly colder liquid, can condense effectively.

The liquid leaving the duct 12*a* of the connection member 12 is then re-introduced into the system. The condensate that is generated inside the heat exchanger 1 is collected and evacuated via the outlet 8, and the residual fumes are expelled via the outlet 7.

As has already been explained previously, a solution similar to the one described above can be applied also to the case of a heat exchanger provided with just two tubes to be connected in series to one another. In this case, the manifold member 13 will have just two mouths, whilst the connection member 12 will have just two ducts.

The heat exchanger 1 can be entirely made of highly recyclable materials, with the minimum amount of insulator made of fibre or the like, via simple operations of deformation and shearing of sheet metal, as well as moulding of plastic material (when the body 6 is made of said material). Assemblage of the components is likewise simple, and in this regard there is to be emphasized the substantial absence of welds. In this regard it should be emphasized that the welding processes, in addition to being operations that are difficult to control and are costly, tend to alter the chemical composition of the steels employed.

The structure of the heat exchanger is extremely compact, at the same time guaranteeing a high thermal efficiency with adequate flowrate of fluid. These advantages are enhanced in the case where two external coiled tubes are used, which, in parallel, supply a single internal coiled tube. The solution proposed affords ample flexibility in relation to the choice of the materials to be used for implementing the unit 20, with a view to a cost/benefit optimization. For example, the external tubes can be made of a material that is of lower quality as compared to the innermost tube and/or of a material that is more resistant to corrosion and less resistant to heat as compared to the material used for the innermost tube (as has been said, the external tubes are less subject to heat and more subject to condensation). In the same way, the thickness of the tubes may be different, for example with the external tubes less thick than the innermost tube.

The fact that the heat-exchanger unit is substantially "self-supporting", i.e., entirely supported by just one wall of the casing, enables use of one and the same casing body for the production of heat exchangers provided for different levels of thermal power, and hence distinguished by different axial dimensions of the turns. For example, all other conditions being equal, the constructional elements described previously—with helices of the tubes 21-23 with eight turns—enable a heat exchanger to be obtained having a power of roughly 32 kW; the same elements, but with tubes 21-23 defining helices with just five turns, enable, instead, a 20-kW heat exchanger to be obtained, and so on according to the number of turns chosen. This being said, heat-exchanger units 20 with helices having different numbers of turns can in any case be combined to a casing 2 of the one and the same type, with evident advantages in production terms. These advantages are evidently enhanced thanks to the solution of providing a constant pitch P for the various helices, and hence the same axial dimensions for the various helices.

The fact that the heat-exchanger unit is supported by a single wall of the casing also presents the advantage of enabling a reduction of the amount of insulators. This advantage is further enhanced thanks to the presence of the annular gap 28, which enables containment of the heating of the wall 3, with the advantages that derive therefrom.

The fact that the heat-exchanger unit is supported by a single end wall of the casing then determines the practical advantage of being able to test the unit 20 before its introduction into the casing 2, unlike heat exchangers according to the known art. Possible defects of fabrication can thus be corrected in a simpler and faster way.

The aforesaid advantages are correlated also to the fact that the inlet and outlet for the fluid are located at one and the same end wall that supports the heat-exchanger unit. Said characteristic renders assembly of the heat exchanger more flexible, with a view to its final applications. It will be appreciated, for example, that by simply rotating the wall 3 angularly with respect to the part 5, the entire unit 20—and hence the connection member—can assume a number of alternative positions, in particular with respect to the fume outlet 7 and to the condensate outlet 9. This aspect proves useful, as has been said, because it enables modification of the position of the connector 12 according to the final application on boilers of various types.

Also the fact that the second hydraulic connection member 13 is set in a position corresponding the same end wall as the one that supports the heat-exchanger unit proves particularly advantageous, in terms of possibility of testing, flexibility of installation of the heat exchanger, and flexibility of production.

In regard to the latter aspect, FIGS. 23-26 illustrate a second embodiment of the heat exchanger according to the invention; said figures show only some components of the heat exchanger, useful for an understanding of the invention.

The heat exchanger of FIG. 23 consists exactly of the same components described previously with reference to the first embodiment, except for the hydraulic connection members 12 and 13, which in this case are configured for providing a connection in parallel of the three tubes 21-23 of the unit 20.

Advantageously, in this embodiment, the connection members 12 and 13 can be identical to one another. The body of the connection members defines three mouths 12*d* that converge into a single duct 12*e*. The ends 21*a*-23*a* of the tubes 21-23 are to be connected to the mouths 12*d* of the member 12, whilst the ends 21*b*-23*b* of the same tubes are to be connected to the mouths 12*d* of the member 13 so as to obtain a connection in parallel of the tubes themselves, as exemplified in FIG. 26. The inlet of the heat exchanger is represented by the duct 12*e* of the member 12, which is designed for connection to the delivery branch of the system that supplies the fluid to be heated, whilst the outlet of the heat exchanger represented by the duct 12*e* of the member 13 is designed for connection to the return branch of the aforesaid system. The diameters of the mouths 12*d* are of course sized according to the diameters of the corresponding tubes 21-23 and of the corresponding sealing means. It is clear that a solution of the type represented in FIGS. 23-26 can be used also in the case of a heat exchanger with only two coiled tubes, in which case the members 12 and 13 have just two mouths 12*d*. With a connection of the type represented schematically in FIG. 26, the diameters of the tubes of the heat-exchanger unit may even be the same as one another.

Once again with reference to the considerable flexibility of production, FIGS. 27-30 illustrate a third embodiment of the heat exchanger according to the invention. Also in said figures only some components of the heat exchanger are shown, useful for an understanding of the invention. Also the heat exchanger of FIG. 27 consists of the same components as those of the first and second embodiments, except for the hydraulic connection members 12 and 13, which in this case are configured for providing a connection in series of the three tubes 21-23 of the unit 20. Advantageously, also in this embodiment the connection members 12 and 13 may be the same as one another.

Figure 30:
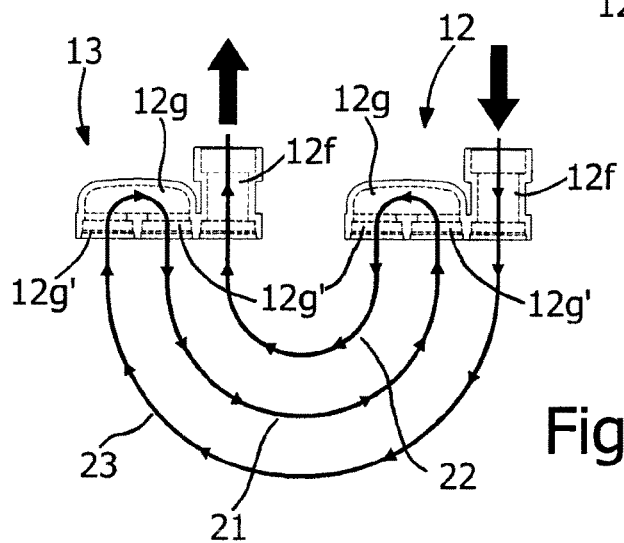
FIG. 30 is a simplified hydraulic diagram of the heat exchanger of FIG. 27.
Figure 35:
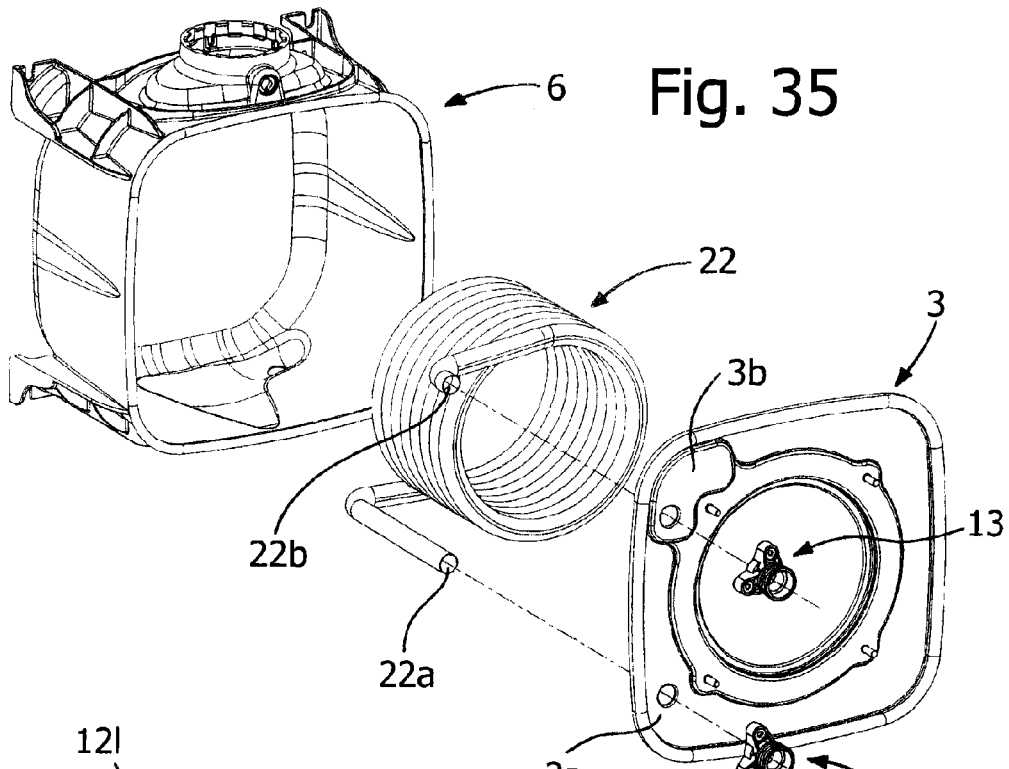
FIG. 35 is a view similar to that of FIG. 17, regarding a heat exchanger according to the invention, in a fifth configuration.

As may be seen in FIG. 30, the body of the connection members in this case defines two ducts 12f and 12g, the duct 12g providing substantially a U-shaped connector. The inlet of the heat exchanger is represented by the duct 12f of the member 12, provided for connection, on one side, to the return branch of the system and, on the other side, to the end 23a of the tube 23. The two end mouths 12g' of the duct 12g of the member 13 (FIG. 29) are designed for connection with the ends 23b and 21b of the tubes 21 and 23, whilst the two end mouths 12g' of the duct 12g of the member 12 are designed for connection with the ends 21a and 22a of the tubes 21 and 22. Finally, the outlet of the heat exchanger is represented by the duct 12f of the member 13, which is connected, on one side, to the end 22b of the tube 22 and, on the other side, to the delivery branch of the system. Of course, also in this case, the diameters of the ducts 12f and of the mouths 12g' are sized according to the diameters of the corresponding tubes 21-23 and of the corresponding sealing means. With a connection of the type represented schematically in FIG. 30, the diameters of the tubes of the heat-exchanger unit can even be the same as one another.

As may be understood, then, one and the same base structure of the heat exchanger according to the invention enables diversification of production in a simple and fast way. The type of connection between the coiled tubes is extremely convenient, it being possible to provide connections in series-parallel (first embodiment), in parallel (second embodiment), and in series (third embodiment), by simply using connection members 12 and 13 differently shaped. The fact that said members 12 and 13 are mounted in the outer part of the casing 2 of the heat exchanger evidently enables differentiation of the models of heat exchangers in a final step of the production process, which may hence be for the most part identical for various models.

Further examples of the flexibility of production of the heat exchanger according to the invention are represented in FIGS. 31-34 and 35-38, which also show only the components of the heat exchanger useful for an understanding of the invention.

The heat exchanger of the fourth embodiment of FIG. 31 basically consists of the same components as those of the first and second embodiments, except for the fact that in this case the heat-exchanger unit 20 includes a single tube, defining a single helix, for example the tube 22, and in this case the connection member 13 is not necessary. As may be noted, in this embodiment, the end regions of the tube 22 are shaped so that the respective ends 22a and 22b will be close to one another. Consequently, as may be clearly seen in FIGS. 32-34, the connector 12 includes in this case two ducts 12h and 12i, which provide respectively the inlet and the outlet of the heat exchanger. The end or inlet 22a of the tube 22 is thus designed for connection to the duct 12h, whilst the end or outlet of the tube 22 is designed for connection to the duct 12i. The diameters of the ducts 12g and 12h will preferably be the same and sized as a function of the diameters of the tube 22 and of the corresponding sealing means.

The fifth embodiment of FIGS. 35-38 is functionally similar to the fourth embodiment of FIGS. 31-34, except for the different conformation of the tube 22 and the presence both of the connection member 12 and of the connection member 13, which function, respectively, as inlet and outlet of the heat exchanger and may advantageously be identical to one another. As may be noted, in this case, each member 12 and 13 defines a single duct 121 and is designed for connection to the ends 22a and 22b, respectively, of the tube 22. From this embodiment it may be appreciated how the inlet and the outlet of the heat exchanger do not have necessarily to be set close to one another, as in the previous case.

As has been seen previously, the invention can be applied to the case of heat-exchanger units 20 comprising a single tube, two tubes, or more than two tubes. For reasons of standardization of production it is possible to envisage that the plates 26 and 30 of the units 20 thus diversified will be in any case always the same, and configured for the maximum number of tubes possible (three, in the examples described previously with reference to the first, second, and third embodiments). On the other hand, clearly it is possible to provide plates 26 and 30 sized and shaped as a function of the number of tubes used.

As regards, instead, the top wall 3 of the casing of the heat exchanger, also its areas 3a and 3b (see FIG. 17) may be prearranged with a number of through holes that depends upon the number of tubes of the heat exchanger (and hence with one, two, three holes, etc.). On the other hand, there is nothing to rule out providing a wall 3 the areas 3a and 3b of which are configured for a maximum number of tubes possible (for example, three holes), providing then suitable plugs or similar means of closing of the holes not used, in the case of a unit with a smaller number of tubes (for example, just one tube or two tubes). Again, it is possible to envisage that the areas 3a and 3b include a single through opening, having a profile and dimensions such as to enable passage of the maximum number of tubes, in which case the connection members 12 and 13 will have a fixing base configured for covering in any case the edges of said through opening, irrespective of the number of tubes of the heat exchanger.

Of course, without prejudice to the principle of the invention, the details of construction and the embodiments may vary widely with respect to what is described and illustrated herein purely by way of example, without thereby departing from the scope of the present invention.

In the embodiments exemplified previously, the axis of the heat exchanger 1 is horizontal, but this must not be considered as in any way binding or limiting. Likewise, the invention must not be understood as being limited to applications of a domestic type, on products such as boilers, water heaters, and the like, the heat exchanger according to the invention being in fact usable also in other contexts.

The cross section of the tube or tubes of the heat-exchanger unit does not necessarily need to be circular, it being possible in fact for the cross section to have other shapes, such as, for example, a substantially square shape, rectangular shape, polygonal shape, or the like.

As already highlighted, irrespective of the number of tubes, the inlet and the outlet of the heat exchanger do not necessarily have to be set close to one another on the wall 3. As highlighted, by appropriately shaping the tubes 21-23, the inlet and the outlet could occupy positions also set at a distance apart from one another, for example with the inlet in the proximity of a first corner of the wall 3 and the outlet in the proximity of a second corner of the same wall, for example the corner diagonally opposite to the first corner.

The body 6 could be made of metal material, for example steel, instead of plastic, and be even made up of a number of parts.

In the embodiments previously exemplified reference has been made to heat-exchanger units comprising a number of coiled tubes having turns of different diameter substantially coaxial to one another so that a tube will form a helix that extends inside a helix formed by another tube. The invention can in any case be applied also to the case of heat-exchanger units with at least two coiled tubes having turns substantially coaxial and of the same diameter, with the turns of one tube interspersed with the turns of the other tube in the axial direction or a direction of height of the unit itself.

The tie-rods 32 can be engaged by snap action to the bottom plate 30, and possibly have both of the ends configured for engagement by snap action to the plates 26 and 30.

The invention claimed is:

1. A heat exchanger having:
    a burner operable to generate combustion fumes;
    a heat-exchanger unit that includes a plurality of substantially coaxial coiled tubes for a fluid, which comprise at least one first tube and one second tube having turns of different diameter, such that the second tube forms a helix that extends within a helix formed by the first tube, first gaps being defined between the turns of the first tube and second gaps being defined between the turns of the second tube; and
    a casing defining a chamber for housing the heat-exchanger unit, the casing having a first end wall, a second end wall, and a peripheral part between the two end walls, the chamber being configured to receive a the combustion fumes for heat exchange with the fluid, the casing having a fume outlet and the first end wall having at least one through opening at a central region thereof,
    wherein the burner is mounted on the first end wall at said through opening to extend at least in part within the helix formed by the first tube, in such a way that the combustion fumes produced by the burner flows through the first gaps and the second gaps before leaving the chamber via the fume outlet,
    wherein each tube of the plurality has a first end and a second end,
    wherein the heat exchanger comprises a supporting arrangement for the heat-exchanger unit, the supporting arrangement being supported by the first end wall of the casing, such that the heat-exchanger unit is supported by the first end wall of the casing via the supporting arrangement,
    wherein the first end of each tube of the plurality is located substantially at the first end wall of the casing,
    wherein the second end of each tube of the plurality is located substantially at the first end wall of the casing,
    wherein each tube of the plurality has a first intermediate angled bend and a second intermediate angled bend, to define a first end stretch of tube and a second end stretch of tube, respectively, which extend in a generally axial direction of the helix formed by the corresponding tube, and
    wherein the first end stretches of tube extend outside the helix formed by the outermost conduit of the plurality.

2. The heat exchanger according to claim 1, wherein the plurality of coiled tubes comprises a third tube for the fluid, substantially coaxial to the first and second tubes, the third tube having turns of a diameter larger than that of the turns of the first tube so as to form a helix within which there extends the helix formed by the first tube, the first and second ends of the third tube being located substantially at the first end wall of the casing,
    and wherein third gaps are defined between the turns of the third tube, in such a way that the combustion fumes produced by the burner also flows through the third gaps before leaving the casing via the fume outlet.

3. The heat exchanger according to claim 1, further comprising a first connection member and a second connection member at the first end wall of the casing, the first end of each tube of the plurality being connected to the first connection member and the second end of each tube of the plurality being connected to the second connection member.

4. The heat exchanger according to claim 3, wherein the first connection member and the second connection member are prearranged for providing a connection in parallel of the tubes of the plurality.

5. The heat exchanger according to claim 2, wherein:
    the second tube has a section of passage larger than the sections of passage of the first and third tubes;
    the first, the second, and third tubes have, in cross section, a shape such that the respective helices have substantially the same pitch.

6. The heat exchanger according to claim 1, wherein at least one of the first end stretches of tube or the of the second stretches of tube are substantially rectilinear and are substantially parallel to one another and with respect to the axis of the helix formed by the respective tube.

7. The heat exchanger according to claim 1, wherein the supporting arrangement comprises a plurality of tie-rod elements that extend substantially in an axial direction of the helices formed by the tubes of the plurality.

8. The heat exchanger according to claim 7, wherein the helices formed by two adjacent tubes of the plurality are set at a distance apart from one another, so that defined between said two adjacent tubes is a substantially cylindrical gap, the tie-rod elements extending in a said cylindrical gap.

9. A heat exchanger having:
    a burner operable to generate combustion fumes;
    a heat-exchanger unit that includes a plurality of substantially coaxial coiled tubes for a fluid, which comprise at least one first tube and one second tube having turns of different diameter, such that the second tube forms a helix that extends within a helix formed by the first tube, first gaps being defined between the turns of the first tube and second gaps being defined between the turns of the second tube; and
    a casing defining a chamber for housing the heat-exchanger unit, the casing having a first end wall, a second end wall, and a peripheral part between the two end walls, the chamber being configured to receive a the combustion fumes for heat exchange with the fluid, the casing having a fume outlet and the first end wall having at least one through opening at a central region thereof,
    wherein the burner is mounted on the first end wall at said through opening to extend at least in part within the helix formed by the first tube, in such a way that the combustion fumes produced by the burner flows through the first gaps and the second gaps before leaving the chamber via the fume outlet,
    wherein each tube of the plurality has a first end and a second end,
    wherein the heat exchanger comprises a supporting arrangement for the heat-exchanger unit, the supporting arrangement being supported by the first end wall of the casing, such that the heat-exchanger unit is supported by the first end wall of the casing via the supporting arrangement, wherein the first end of each tube of the plurality is located substantially at the first end wall of the casing, wherein the second end of each tube of the plurality is located substantially at the first end wall of the casing, wherein the supporting arrangement includes a first end plate, generally facing the first end wall of the casing and having a respective through opening connected to the through opening of the first wall of the casing and substantially coaxial thereto, at least one of said openings being defined by a tubular portion of the first end wall or of the first end plate, the first end plate being secured to the first end wall;

wherein the turn at a first end of the helix formed by a tube of the plurality is in contact with the first end plate, and and wherein at least one annular portion of the first end plate is spaced apart from the first end wall of the casing, in such a way that between the first end wall and said annular portion of the first end plate there is defined a first generally annular air gap which is in fluid communication with a second generally annular air gap comprised between the peripheral part of the casing and the helix formed by the outermost tube of the plurality.

10. The heat exchanger according to claim 9, wherein the supporting arrangement includes a second end plate, generally facing the second end wall of the casing, at a distance therefrom, and the turn at a second end of the helix of at least one tube of the plurality is in contact with the second end plate.

11. The heat exchanger according to claim 10, wherein the supporting arrangement comprises a plurality of tie-rod elements that extend substantially in an axial direction of the helices formed by the tubes of the plurality; and wherein the tie-rod elements have opposite ends secured to the first and second end plates, respectively, in the absence of welds.

12. The heat exchanger according to claim 9, wherein the first end plate is secured to the first end wall in the absence of welds.

13. A heat exchanger having:
a burner operable to generate combustion fumes;
a heat-exchanger unit that includes:
  a plurality of substantially coaxial coiled tubes for a fluid, comprising at least one first tube and one second tube having turns of different diameter, such that the second tube forms a helix that extends within a helix formed by the first tube, first gaps being defined between the turns of the first tube and second gaps being defined between the turns of the second tube; and
  a casing defining a chamber for housing the heat-exchanger unit, the casing having a first end wall, a second end wall, and a peripheral part between the first and second end walls, the chamber being configured to receive the combustion fumes for heat exchange with the fluid, the casing having a fume outlet and the first end wall having at least one through opening at a central region thereof, wherein the burner is mounted on the first end wall at said through opening to extend at least in part within the helix formed by the first tube, in such a way that the combustion fumes produced by the burner flows through the first gaps and the second gaps before leaving the chamber via the fume outlet, wherein the heat exchanger comprises a supporting arrangement for the heat-exchanger unit, the supporting arrangement being supported by the first end wall of the casing, such that the heat-exchanger unit is supported by the first end wall of the casing via the supporting arrangement, wherein the supporting arrangement includes:
a first end plate, generally facing the first end wall of the casing and having a respective through opening connected to the through opening of the first end wall and substantially coaxial thereto, at least one of said openings being defined by a tubular portion of the first end wall or of the first end plate, the first end plate being secured to the first end wall, wherein at least one annular portion of the first end plate is spaced apart from the first end wall of the casing, in such a way that between the first end wall and said annular portion of the first end plate there is defined a first generally annular air gap which is in fluid communication with a second generally annular air gap comprised between the peripheral part of the casing and the helix formed by the outermost tube of the plurality, and wherein the turn at a first end of a helix formed by a tube of the plurality is in contact with the first end plate.

14. The heat exchanger according to claim 1,
wherein the heat-exchanger unit and the supporting arrangement form an assembly which is hung from the first end wall of the casing, in such a way that an end of said assembly opposite to said first end wall is set at a distance from the second end wall of the casing to define an end gap therebetween, and wherein said end gap is in fluid communication with a substantially annular gap comprised between the peripheral part of the casing and the helix formed by the outermost tube of the plurality.

15. The heat exchanger according to claim 3, wherein the first connection member and the second connection member are configured for providing a connection in series of the tubes of the plurality.

16. The heat exchanger according to claim 3, wherein the first connection member and the second connection member are configured for providing a connection in series-parallel of at least three tubes of the plurality.

* * * * *